(12) United States Patent
Kang et al.

(10) Patent No.: US 12,311,528 B2
(45) Date of Patent: May 27, 2025

(54) DEVICE AND METHOD OF PROTECTING ITEM BASED ON SERVING ORDER

(71) Applicant: SAMSUNG ELECTRONICS CO., LTD., Suwon-si (KR)

(72) Inventors: Hyunjoo Kang, Suwon-si (KR); Daekyung Ahn, Suwon-si (KR); Hoon Han, Suwon-si (KR); Joayoung Lee, Suwon-si (KR); Jiwoong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 17/956,418

(22) Filed: Sep. 29, 2022

(65) Prior Publication Data

US 2023/0139512 A1    May 4, 2023

Related U.S. Application Data

(63) Continuation of application No. PCT/KR2022/012581, filed on Aug. 23, 2022.

(30) Foreign Application Priority Data

Nov. 2, 2021 (KR) .................. 10-2021-0148733
Nov. 4, 2021 (KR) .................. 10-2021-0150690

(51) Int. Cl.
*B25J 11/00* (2006.01)
*G05D 1/00* (2006.01)
*G08B 7/06* (2006.01)

(52) U.S. Cl.
CPC ........ *B25J 11/0045* (2013.01); *G05D 1/0214* (2013.01); *G05D 1/0274* (2013.01); *G08B 7/06* (2013.01)

(58) Field of Classification Search
CPC ... B25J 5/007; B25J 11/008; B25J 9/16; B25J 11/00; B25J 5/00; B25J 11/0045; G05D 1/0274; G05D 1/0214; G08B 7/06
See application file for complete search history.

(56) References Cited

U.S. PATENT DOCUMENTS 3,997,028 A * 12/1976 Lopez .................... A47J 39/02
                                                    186/44
9,463,927 B1 * 10/2016 Theobald ............. B65G 1/1373
(Continued)

FOREIGN PATENT DOCUMENTS

CN        207480601 U      6/2018
CN        108724177        11/2018
(Continued)

OTHER PUBLICATIONS

PCT International Search Report dated Nov. 24, 2022 for PCT/KR2022/012581.
(Continued)

*Primary Examiner* — Stephen Holwerda
(74) *Attorney, Agent, or Firm* — NIXON & VANDERHYE P.C.

(57) ABSTRACT

An electronic device may be configured to, based at least on items on a plurality of serving trays and/or pieces of order information of a plurality of destinations, determine a serving order in which the items on the plurality of serving trays need to be delivered, and while an item is delivered to one destination among the plurality of destinations, provide protection for a serving tray to which a serving order subsequent to a serving order of the one destination is mapped.

20 Claims, 19 Drawing Sheets

(56) References Cited

U.S. PATENT DOCUMENTS

| | | | |
|---|---|---|---|
| 9,489,490 B1 | 11/2016 | Theobald | |
| 2017/0364074 A1* | 12/2017 | Lau | G05D 1/0088 |
| 2020/0223632 A1* | 7/2020 | Melanson | B60P 3/00 |
| 2021/0033405 A1 | 2/2021 | Song et al. | |
| 2021/0096572 A1 | 4/2021 | Jang et al. | |
| 2021/0212455 A1* | 7/2021 | Jung | A47F 10/06 |

FOREIGN PATENT DOCUMENTS

| | | | |
|---|---|---|---|
| JP | 2009-172410 A | 8/2009 | |
| KR | 10-2019-0092337 | 8/2019 | |
| KR | 10-2020-0085658 | 7/2020 | |
| KR | 10-2020-0087362 A | 7/2020 | |
| KR | 10-2021-0015577 | 2/2021 | |
| KR | 10-2021-0072588 | 6/2021 | |
| KR | 10-2021-0119886 A | 10/2021 | |
| WO | WO 2019020407 A1 | 1/2019 | |
| WO | WO-2020141622 A1 * | 7/2020 | A47B 31/00 |
| WO | WO 2021162951 A1 | 8/2021 | |

OTHER PUBLICATIONS

Extended European Search Report dated Oct. 16, 2024 for EP Application No. 22890142.7.

* cited by examiner

DEVICE AND METHOD OF PROTECTING ITEM BASED ON SERVING ORDER

CROSS-REFERENCE TO RELATED APPLICATIONS

This application is a continuation of International Application No. PCT/KR2022/012581 designating the United States, filed on Aug. 23, 2022, in the Korean Intellectual Property Receiving Office and claiming priority to Korean Patent Application No. 10-2021-0148733, filed on Nov. 2, 2021, and Korean Patent Application No. 10-2021-0150690, filed on Nov. 4, 2021, in the Korean Intellectual Property Office, the disclosures of which are incorporated by reference herein in their entireties.

BACKGROUND

1. Field

Certain example embodiments relate to a method of protecting an item based at least on a serving order.

2. Description of Related Art

Recently, driven by the advancement of electronics technology, various types of electronic devices have been developed and distributed. In stores, cafes, restaurants, and the like, electronic devices, such as kiosks and robots, that replace humans have been actively used. The electronic devices may perform operations, such as processing an order requested by a customer and delivering the order to a customer.

However, there has also been a constant demand for a method of efficiently delivering ordered food to satisfy many customers and providing a consistent service to many customers such that an electronic device, such as a robot, may perform labor rather perfectly, thus replacing humans. A needed method may efficiently deliver ordered food and a service item by a few robots while satisfying many customers.

SUMMARY

Example embodiments of the disclosure may provide an electronic device that allows an employee to put cooked food on a robot without considering a serving order and a table a table location.

The electronic device may provide a service that allows a customer of a table to take ordered food only without taking food of another table.

The electronic device may provide a solution for exactly delivering food to a certain table while serving food items to a plurality of tables simultaneously and for preventing or reducing the likelihood of food of another table from being taken.

According to various example embodiments, an electronic device may include a plurality of serving trays each configured to accommodate an item; a driver configured to move the electronic device; a memory configured to store computer-executable instructions; and a processor (including processing circuitry) configured to execute the computer-executable instructions by accessing the memory, in which the computer-executable instructions are configured to, based on items on the plurality of serving trays and pieces of order information of a plurality of destinations, determine a serving order in which the items on the plurality of serving trays need to be delivered, and while an item is delivered to one destination among the plurality of destinations, provide protection for a serving tray to which a serving order subsequent to a serving order of the one destination is mapped.

According to various example embodiments, a method implemented by a processor may include, based at least on items on a plurality of serving trays and pieces of order information of a plurality of destinations, determining a serving order in which the items on the plurality of serving trays need to be delivered, and while an item is delivered to one destination among the plurality of destinations, providing protection for a serving tray to which a serving order subsequent to a serving order of the one destination is mapped.

The electronic device may perform serving by automatically identifying a serving order for each tray although an employee puts cooked food on a robot without considering a serving order and a table position.

The electronic device may exactly deliver food to a certain table while serving food items to a plurality of tables simultaneously and may prevent or reduce the likelihood of wrong delivery by preventing or reducing the likelihood of access to food of another table.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
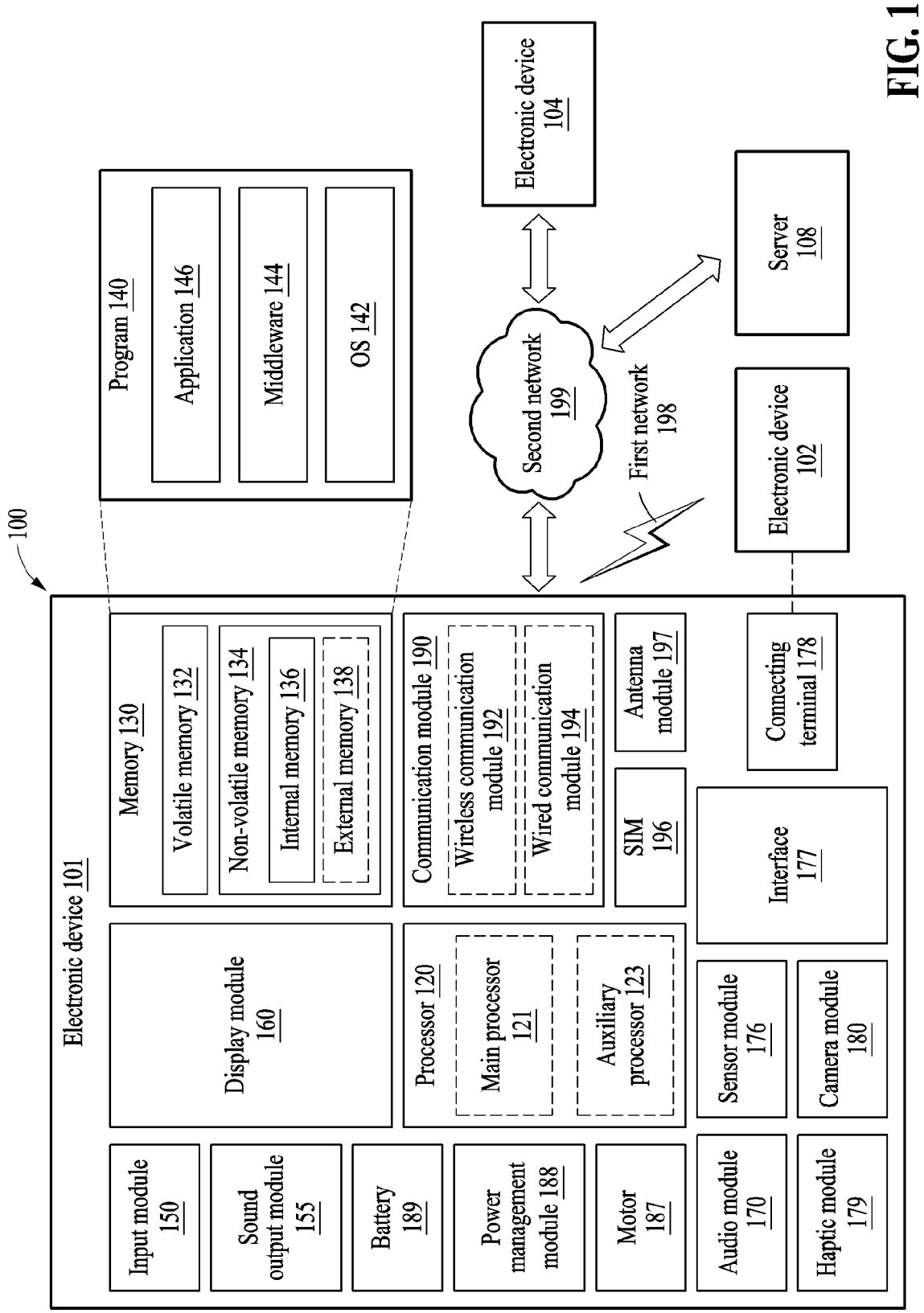
FIG. 1 is a block diagram illustrating an electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120 including processing circuitry, a memory 130, an input module 150, a sound output module 155, a display module 160, an audio module 170, and a sensor module 176, an interface 177, a connecting terminal 178, a haptic module 179, a camera module 180, a motor 187, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. Each processor herein includes processing circuitry.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150, which may include input circuitry, may receive a command or data to be used by another component (e.g., the processor 120 including processing circuitry) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

Figure 2:
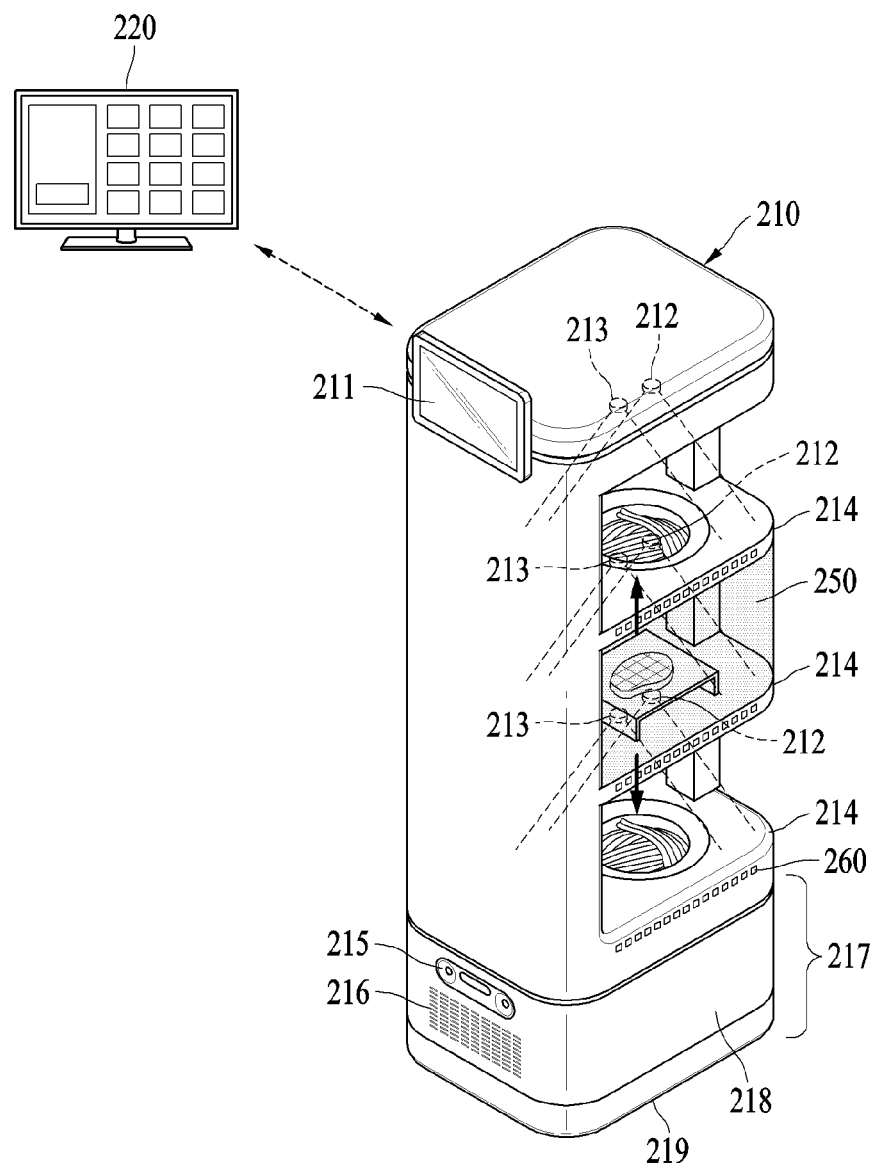
FIG. 2 is a diagram illustrating an electronic device implemented as a serving robot according to various example embodiments.

A driving module may drive the electronic device 101. The driving module may include the motor 187 and a wheel connected to the motor 187. In FIG. 2 to be described below, illustrated is an example of a pair of wheels spaced and disposed along an axis (e.g., a lateral axis) perpendicular to a driving direction (e.g., a longitudinal axis) at a bottom center of the electronic device 101, but examples are not limited thereto. The disposition and number of wheels of the motor 187 of the driving module may vary depending on a design.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent or proximate to the first surface and capable of supporting a designated a high-frequency band (e.g., the mmWave band), and a plurality of antennas (e.g., array antennas) disposed on a second surface (e.g., a top or a side surface) of the PCB, or adjacent or proximate to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

FIG. 2 is a diagram illustrating an electronic device implemented as a serving robot according to various example embodiments.

An electronic device 210 (e.g., the electronic device 101 of FIG. 1) may be implemented as a serving robot, as illustrated in FIG. 2. For example, the electronic device 101 may be a public mobile robot, which is a serving robot configured to autonomously drive and visit a plurality of destinations (e.g., a table). The electronic device 101 may establish communication with an order server 220 (e.g., the server 108 of FIG. 1) and receive, from the order server 220, information related to orders of customers of the plurality of destinations.

The order server 220 may manage order information of each destination. For example, the order server 220 may correct order information (e.g., point-of-sale (POS) data) on a customer of each destination from the electronic device 210 and/or an external device (e.g., a mobile terminal of the customer, a tablet terminal of an employee, and a kiosk terminal). The order information may include seated information, order receiving information, ordered menu information, and serving information. Seated information of each destination may include identification information (e.g., a table number) of the destination, whether a customer sits in the destination, and the number of seated customers. Order receiving information of each destination may include whether a customer seated in the destination places an order and the time of the order. Ordered menu information of each destination may include a type of item ordered by a seated customer at the destination and the number of ordered items. Serving information of each destination may include whether each item ordered from each destination has been served. In addition, the order information may include a side item (e.g., a side menu item) accompanying an ordered main item (e.g., a main dish), a special order (e.g., whether additional tableware is needed), additional food, whether a customer is a customer with a reservation, the number of visits of the customer, and whether the customer is a very-important-person (VIP) customer.

The electronic device 210 may include a display module 211 (e.g., the display module 160 of FIG. 1), a camera module 212 (e.g., the camera module 180 of FIG. 1), a lighting module 213, a serving tray 214, a sensor module 215 (e.g., the sensor module 176 of FIG. 1), a sound output module 216 (e.g., the sound output module 155 of FIG. 1), a communication module 218 (e.g., the communication module 190 of FIG. 1), and a driver 219 (e.g., the motor 187 of FIG. 1). In addition, the electronic device 210 may include a protection module 250 and tray light 260. Although in FIG. 2, the sensor module 215, the sound output module 216, the communication module 218, and the driver 219 are illustrated as being included in a base driving platform 217, examples are not limited thereto. The base driving platform 217 may further include a battery (e.g., the battery 189 of FIG. 1) and a power management module (e.g., the power management module 188 of FIG. 1).

The display module 211 may visually output information related to item delivery to at least one of a user and a customer. For example, the display module 211 may output visual information (e.g., text and an image) that guides to an item to be delivered to a destination where the electronic device 210 reaches. The display module 211 may output visual information that guides to an item to be protected at the destination.

In addition, the electronic device 210 may further include an input module (e.g., the input module 150 of FIG. 1) integrated with the display module 211. The electronic device 210, through the input module, may receive at least one of a touch input and a voice input from at least one of a user and a customer.

The camera module 212 may be disposed to face each serving tray. For example, in FIG. 2, the camera module 212 may face a serving tray from the ceiling facing the serving tray. In other words, the camera module 212 may have a viewing angle for capturing the serving tray. The camera module 212 may capture an image including an item (e.g., food) on the serving tray. A processor (e.g., the processor 120 of FIG. 1) of the electronic device 210, based on an image captured by the camera module 212, may recognize a type (e.g., a food type) of item on each serving tray and the number of items (e.g., the number of food items). An example of an item herein is mainly described as food, but examples are not limited thereto, and the item may be such things as tableware.

The lighting module 213 may be a module for projecting light onto a serving tray. The lighting module 213, when the electronic device 210 reaches a target destination to which a target item on a serving tray needs to be delivered, may light up the serving tray and the target item on the serving tray.

Each serving tray (e.g., the serving tray 214) may be a tray for accommodating an item. Although in FIG. 2 three serving trays are illustrated as being spaced and in a direction perpendicular to the ground, the number and structure of the serving tray 214 may not be limited thereto and may vary depending on a design. At least one serving tray among a plurality of serving trays may be on the same surface as another serving tray. The electronic device 210 may include one or more serving trays (e.g., the serving tray 214).

The sensor module 215 may include a sensor for driving the electronic device 210. For example, the sensor module 215 may include one or a combination of two or more of a light detection and ranging (LiDAR) sensor, a depth sensor (e.g., a time-of-flight (TOF) sensor), and an ultrasonic sensor. The electronic device 210, through the sensor module 215, may set a driving route by detecting an object and a background around the electronic device 210 and perform a maneuver for avoiding an obstacle.

The sound output module 216 may output, to a customer, a sound signal (e.g., voice guidance) for indicating information (e.g., the name and amount of a currently delivered item) related to item delivery. The sound output module 216 may record a sound signal (e.g., guidance to a customer) to be delivered from a user to the customer and a sound signal (e.g., a request from the customer) to be delivered from the customer to the user. In FIG. 2, for example, a speaker of the sound output module 216 is illustrated as being at a lower part of the electronic device 210, and a microphone of the sound output module 216 may be integrated with the display module 211.

The communication module 218, including communication circuitry, may establish wired or wireless communication with the order server 220. For example, the communication module 218 may receive POS data from the order server 220. The communication module 218, when a target item has been delivered by the electronic device 210, may report the completed delivery of the target item (e.g., served food) to the order server 220. In addition, the communication module 218 may establish communication with another terminal (e.g., a wearable device) of a user other than the order server 220. The communication module 218 may transfer an anomaly detected by the electronic device 210 to the other terminal of the user.

The driver 219 may move the electronic device 210. The driver 219 may include a motor and/or wheels. The driver 219 may move the electronic device 210 forward and backward and rotate the electronic device 210 on the ground by driving the motor.

The protection module 250, including a protector, may provide protection for an item on the serving tray 214. The protection module 250 may physically prohibit, restrict, or prevent or reduce the likelihood of invasion of an object (e.g., the hand of a third person) unauthorized to access a tray space in which an item is placed and the placed item. For example, the protection module 250 may physically, partially at least, prevent or reduce the likelihood of unauthorized physical access to the item on the serving tray 214. The protection module 250 may cover at least some of the tray space including the serving tray 214 by actuating a protection guard. The protection module 250 may be configured to cover one or a combination of two or more of one side (e.g., one side based on a driving axis) of the tray space, both sides (e.g., both sides based on the driving axis) of the tray space, and all the sides of the tray space. As another example, the protection module 250 may move or fix a serving tray. The protection module 250 may provide individual protection for each of the plurality of serving trays. As described below, the protection module 250 may provide protection for some items at a destination and release the protection sequentially in a serving order. Examples of the protection module 250 may be described below with reference to FIGS. 11 through 17.

The tray light 260 may refer to light (e.g., a light-emitting diode) on at least one side of a tray. The tray light 260 may provide feedback based on lighting up a serving tray corresponding to a destination at which the electronic device 210 arrives. Although FIG. 2 illustrates an example where the tray light 260 is on one side (e.g., the left side) of the electronic device 210 based on a driving axis (e.g., a longitudinal axis) of the electronic device 210 examples are not limited thereto, and the tray light 260 may be on both sides of the electronic device 210 based on the driving axis of the electronic device 210. The tray light 260 may output light of a first color (e.g., green) when an item on a tray is allowed to be delivered at each destination and may output light of a second color (e.g., red) when the delivery is restricted.

The electronic device 210 may serve simultaneously prepared items (e.g., simultaneously cooked food items) in a service space (e.g., a restaurant) to multiple destinations (e.g., multiple tables) in one drive. The electronic device 210, even when a user (e.g., an employee), who does not consider a serving order, randomly places items on serving trays, may visit destinations in the serving order by identifying an item on each serving tray. In addition, the electronic device 210, when a plurality of items is on each serving tray (e.g., the serving tray 214), may prevent or reduce the likelihood of, through a protection operation (e.g., a warning output and a physical protection operation), a customer of another destination from unloading a target item to be delivered to a target destination.

Figure 3:
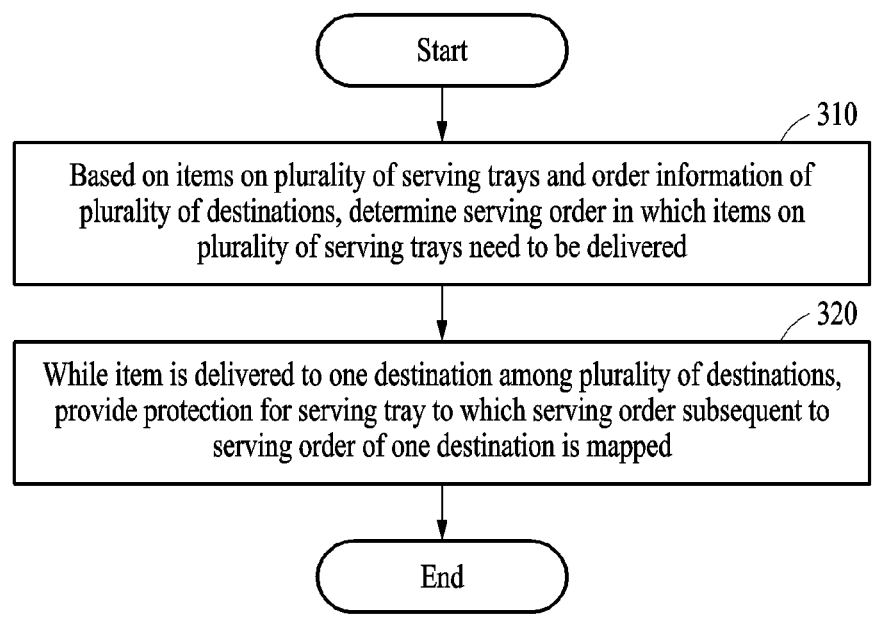
FIGS. 3 and 4 are flowcharts each illustrating a method of protecting an item, according to various example embodiments.
Figure 4:
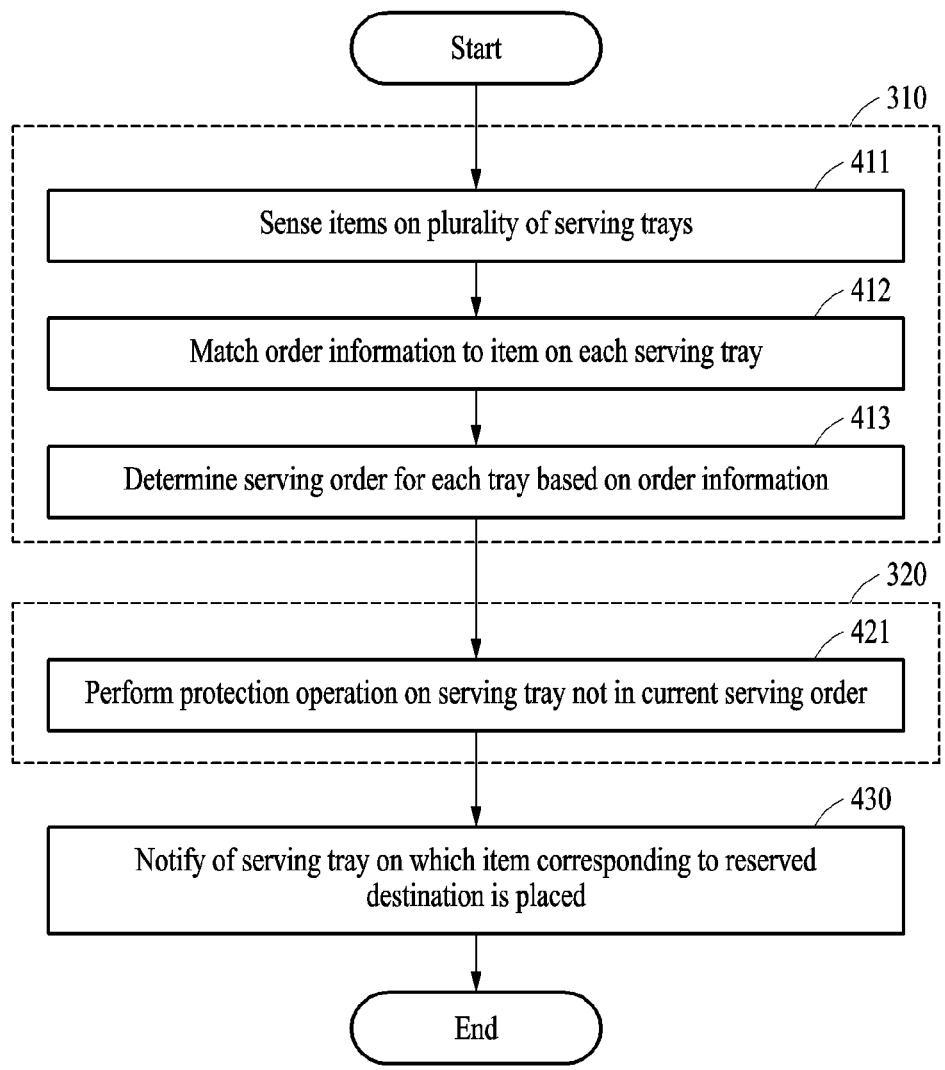

FIGS. 3 and 4 are flowcharts each illustrating a method of protecting an item, according to various example embodiments.

In operation 310, an electronic device (e.g., the electronic device 101 of FIG. 1), based on items on a plurality of serving trays and order information of a plurality of destinations, may determine a serving order in which the items on the plurality of serving trays need to be delivered.

For example, in operation 411, the electronic device may sense the items on the plurality of serving trays. The electronic device may obtain an image of an item on a certain serving tray through a camera sensor installed on each of the plurality of serving trays. The electronic device, by analyzing a captured image of an item, may identify a type and quantity of an item in each image. For example, the electronic device may determine a type and quantity of an item by comparing a captured image of each serving tray with an item image (e.g., a food image) by each menu item in an items database (e.g., a restaurant food database) on a service space. The electronic device may determine, based on the captured image described above, whether an item is on each serving tray. Sensing an item is described below with reference to FIG. 5. However, the sensing of the item is not limited to the foregoing example, and information on an item on each serving tray may be provided based on an input from a user.

In operation 412, the electronic device may match order information to an item on each serving tray. The electronic device, as described above, may receive POS data from an order server. The electronic device may match order information at each destination among the POS data with an identified item on each serving tray. The order information may include, for example, information on an order time, a destination identifier (e.g., a table number), an item type (e.g., a food type), a served item, and an unserved item. The electronic device, based on the order information, may determine a destination to which an item on each serving tray needs to be delivered. Matching order information to an item is described below with reference to FIG. 6.

In operation 413, the electronic device may determine a serving order for each tray based on the order information. The serving order may refer to an order in which items placed in the electronic device need to be delivered. For example, when the electronic device accommodates a second item of a second order subsequent to a first item of a first order, the electronic device may deliver the first item of the first order first to a first destination, and subsequently, the second item of the second order to a second destination. A protection order for serving trays may be determined based on the serving order described above. For example, each serving tray may be protected at a destination of a serving order preceding a serving order of the serving tray. In other words, the electronic device may determine to protect a serving tray mapped to a serving order posterior to a serving order of a visited destination.

In operation 320, the electronic device, while an item is delivered to a first (e.g., one) destination among the plurality of destinations, may provide protection for a serving tray to which a serving order subsequent to a serving order of the first (e.g., one) destination is mapped. In operation 421, the electronic device may perform a protection operation on a serving tray not in a current serving order.

For example, the electronic device may perform a non-physical protection operation. The electronic device, when detecting an unauthorized attempt to unload an item, may perform a warning operation upon access. The electronic device may monitor an action (e.g., an entry of hands, gloves, and tongs to a tray space) of another customer taking an item (e.g., food). The electronic device may output one or a combination of two or more of a warning sound, speech, and lighting for warning of accessing. The non-physical protection operation is described below with reference to FIG. 10. As another example, the electronic device may perform a physical protection operation. The electronic device may protect a serving tray in a serving order subsequent to a serving order of a reserved destination by driving at least one of a protection guard and a serving tray through a protection module. The electronic device may release protection for a serving tray of which an item needs to be delivered at the reserved destination and maintain protection for serving trays accommodating the remaining items. For reference, the electronic device may individually perform the non-physical and physical protection operations described above or may simultaneously perform a combination of the non-physical and physical protection operations.

The electronic device may visit a plurality of destinations sequentially based on a serving order.

In operation 430, the electronic device may notify a customer of a serving tray accommodating an item corresponding to a reserved destination. For example, the electronic device may light up the serving tray by activating a lighting module corresponding to the serving tray mapped to the reserved destination. In addition, the electronic device may activate tray light of the serving tray. The electronic device may turn on the tray light in the first color. The electronic device may output at least one of an image and sound signals that guide to a serving tray accommodating an item delivered at a destination together with the lighting operation described above.

Figure 5:
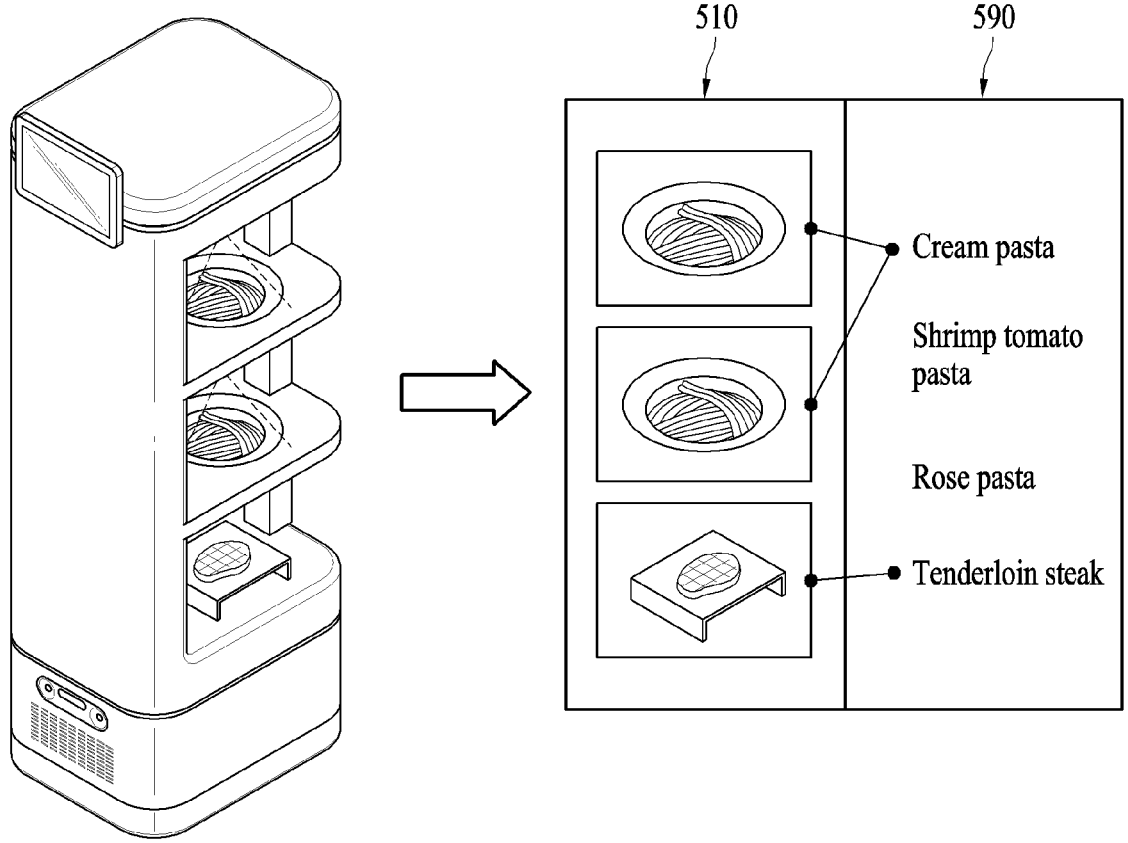
FIG. 5 is a diagram illustrating item matching according to various example embodiments.

FIG. 5 is a diagram illustrating item matching according to various example embodiments.

An electronic device 500 (e.g., the electronic device 101 of FIG. 1), in response to an item being on at least one serving tray among the plurality of serving trays, may identify the item on the serving tray. For example, the electronic device 500 may capture images 510 through a camera sensor on each serving tray.

The electronic device 500 may compare the captured images 510 with an items database 590 of a service space. The electronic device 500, by comparing the captured images 510 and the items database 590, may generate an identification result on an item on each serving tray. The identification result may be a result of identifying an item on each serving tray and may include, for example, a name of the identified item. The items database 590 may include a list of items provided to customers in a service space and may include, for example, an item name (e.g., a menu item name) and an item image (e.g., a food image). In the example illustrated in FIG. 5, the electronic device 500 may recognize pastas from images captured in first and second serving trays and recognize steak from an image captured in a third serving tray. The electronic device 500 may determine that the pastas are respectively placed on the first and second serving trays and the steak is placed on the third serving tray.

Figure 6:
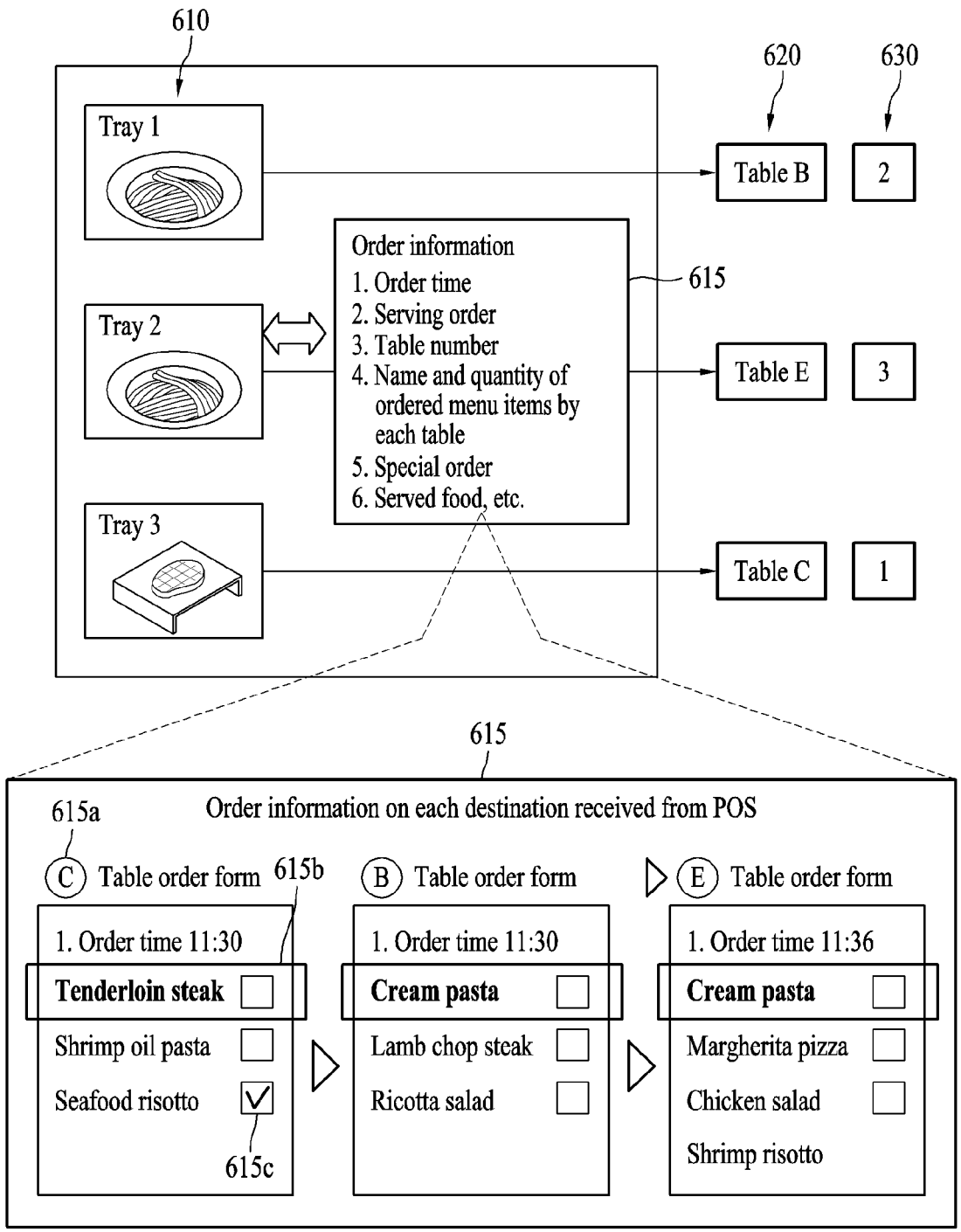
FIG. 6 is a diagram illustrating determining a serving order according to various example embodiments.

FIG. 6 is a diagram illustrating determining a serving order according to various example embodiments.

An electronic device (e.g., the electronic device 101 of FIG. 1), based on pieces of order information of a plurality of destinations and an identification result of an item, may map a serving tray accommodating the item among a plurality of serving trays to one destination among the plurality of destinations. The electronic device may generate a mapping result 620 that maps each serving tray to a destination to which an item on each serving tray needs to be delivered. For example, the electronic device may compare items 610 identified in the plurality of serving trays with order information 615.

In the example illustrated in FIG. 6, the order information 615 may include information on an order time, a serving order, a destination identifier 615a (e.g., a table number and a table name), a name 615b and a quantity of an ordered item, a special order requested by a customer, and a served item 615c at a destination. An example illustrated is that a customer at table C ordered steak and customers at tables B and E each ordered a pasta. In the mapping result 620, a first serving tray accommodating a pasta may be mapped to table B, a second serving tray accommodating another pasta may be mapped to table E, and a third serving tray accommodating steak may be mapped to table C. The electronic device, when a plurality of items having the same name are respectively on a plurality of serving trays, may map a destination of a preceding serving order to an upper serving tray of the plurality of serving trays and a destination of a subsequent serving order to a lower serving tray. Accordingly, when a user places items regardless of serving orders, a customer at a destination to which an item is to be delivered first may be served the item from a position (e.g., a high position) where the item is rather conveniently picked up.

The electronic device, based on a mapping result of a serving tray and pieces of order data of a plurality of destinations, may determine a serving order of a serving tray accommodating an item. For example, the electronic device, based on time information related to delivery of an item from the pieces of order information of the plurality of destinations, may determine a serving order 630 of a plurality of items on a plurality of serving trays. The electronic device, based on order times of the plurality of serving trays, may determine a serving tray accommodating an item ordered first to have a prior serving order. In the example illustrated in FIG. 6, an order from table C is received at 11:30, an order from table B is received at 11:35, and an order from table E is received at 11:36. The electronic device may determine the serving order 630 for table C to be a first priority, for table B to be a second priority, and for table E to be a third priority. However, determining the serving order 630 may not be limited to the foregoing example and may vary depending on a design.

Figure 7:
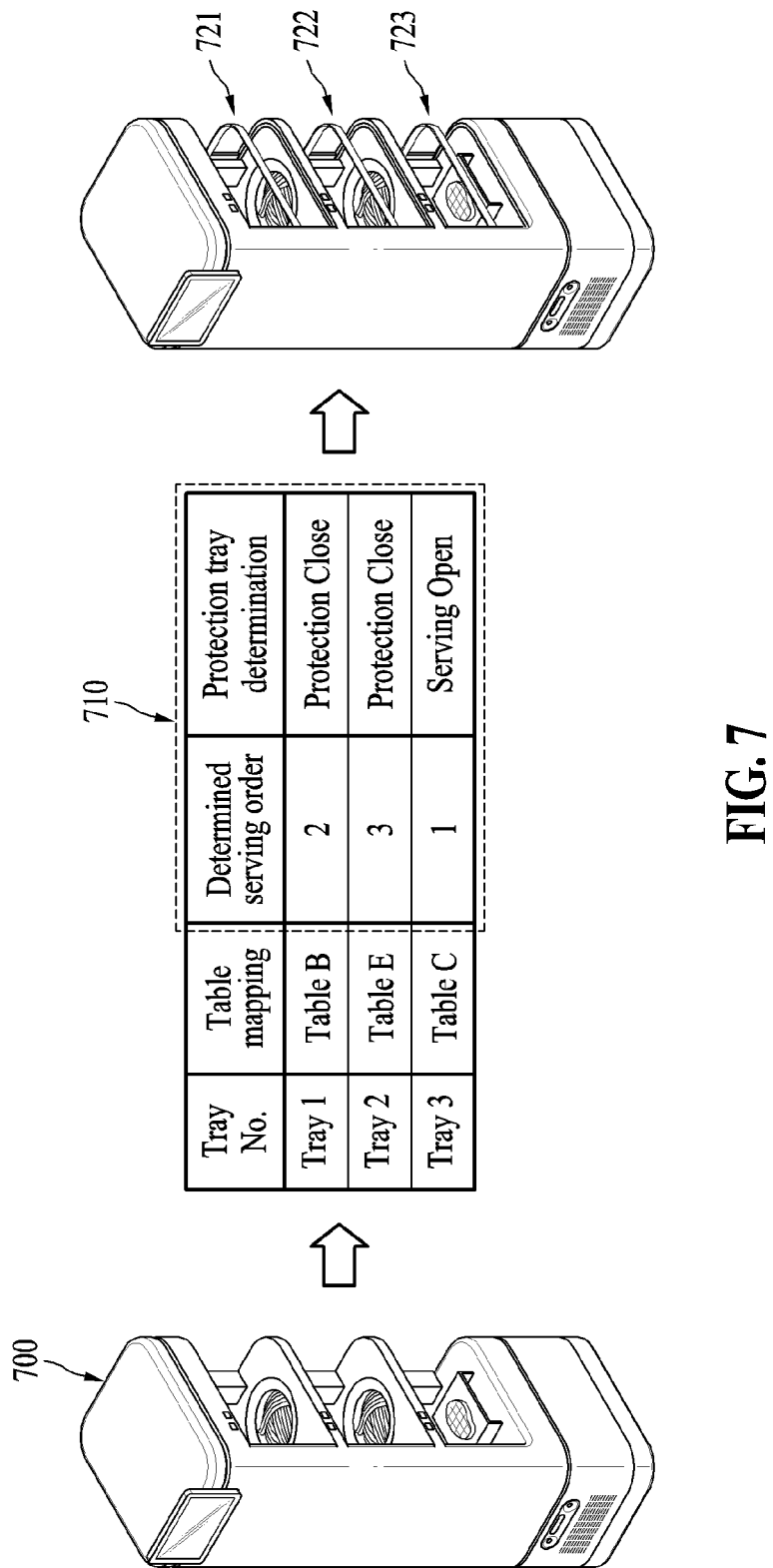
FIG. 7 is a diagram illustrating protecting a serving tray based on a serving order, according to various example embodiments.

FIG. 7 is a diagram illustrating protecting a serving tray based on a serving order, according to various example embodiments.

An electronic device 700 (e.g., the electronic device 101 of FIG. 1) may determine a serving tray to be protected based on the serving order determined as described with respect to FIG. 6. Protection tray information 710 may indicate a serving tray to be protected based on a serving order. The electronic device 700, when delivering a target item to a target destination, may determine serving trays mapped to a serving order subsequent to a serving order of the target destination to be protection targets. For example, according to the protection tray information 710 illustrated in FIG. 7, the electronic device 700, for delivering steak to table C, may deactivate protection of a third serving tray 723 corresponding to table C. The electronic device 700 may activate protection for a first serving tray 721 and a second serving tray 722 each accommodating pastas to be respectively delivered to tables B and E and may maintain the activated protection until reaching a destination corresponding to each of the first and second serving trays 721 and 722.

For reference, as an example of a protection module, a bar-shaped guard as a protector is illustrated. However, examples are not limited thereto, and various examples of the protection module are described below with reference to FIGS. 11 through 17.

Each embodiment herein may be used in combination with any other embodiment(s) herein.

Figure 8:
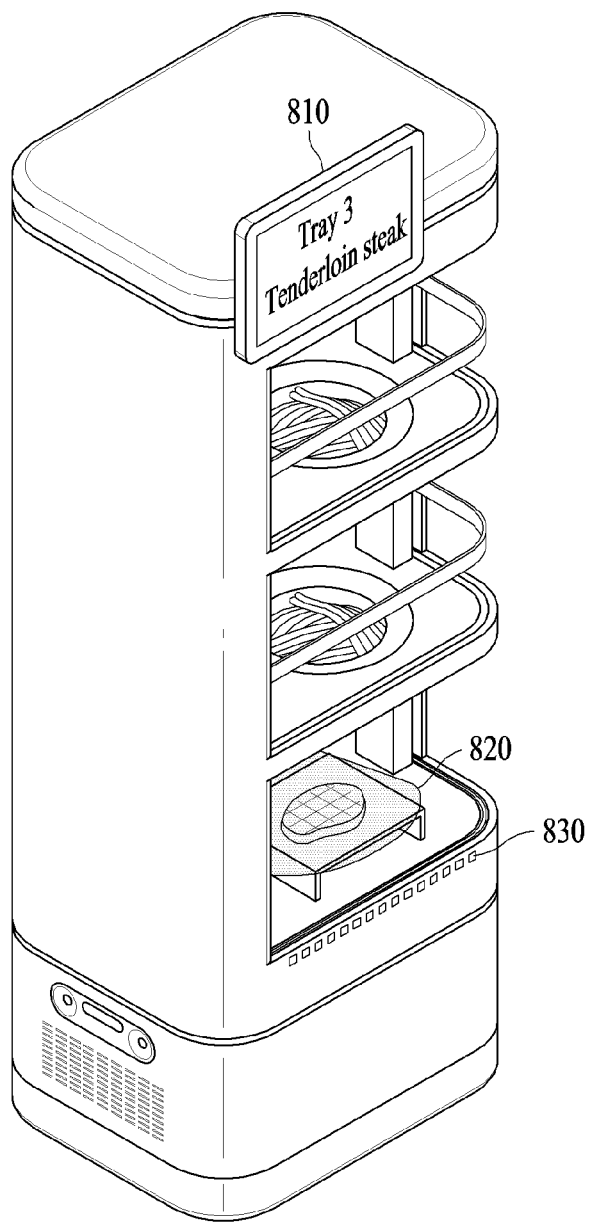
FIGS. 8 and 9 are diagrams each illustrating sequential delivery of items protected based on a serving order according to various example embodiments.
Figure 9:
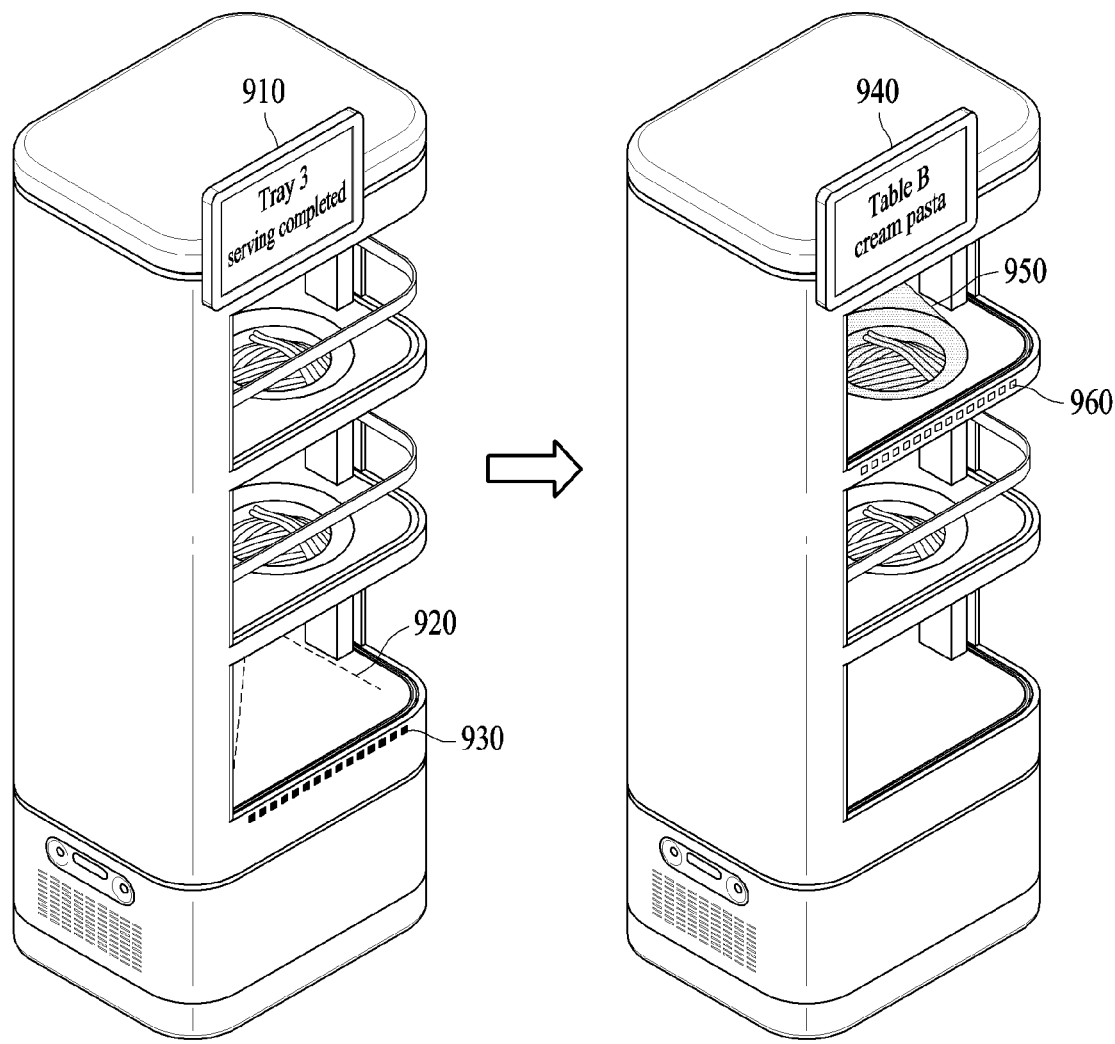

FIGS. 8 and 9 are diagrams each illustrating sequential delivery of items protected based on a serving order according to various example embodiments.

An electronic device (e.g., the electronic device 101 of FIG. 1), in response to a target item reaching a target destination, may provide a guide for indicating a serving tray accommodating the target item. For example, the electronic device, as the guide for indicating a serving tray accommodating the target item, may perform one or a combination of two or more of activation of light on one side of the serving tray accommodating the target item, activation of light for lighting up the target item, an output of visual information for describing the target item on a display, and an output of auditory information for describing the target item.

For example, in FIG. 8, the electronic device may deliver steak to table C as examples described above with reference to FIGS. 5, 6, and 7. The electronic device, in response to reaching table C, through a display module 810, may guide a customer by visually outputting that the steak is on a third serving tray. In addition, the electronic device may output light 820 through a lighting module to the third serving tray accommodating the steak. The electronic device may also emit light 830 on one side of the third serving tray.

The electronic device, in response to the target item reaching the target destination, may release protection for the serving tray accommodating the target item. For example, a plurality of destinations may include a first destination and a second destination corresponding to a serving order subsequent to the first destination. In the example illustrated in FIG. 8, the first destination may be table C and the second destination may be table B or E. The electronic device, based on a user's input, may activate a protection module (including a protector) of a first tray mapped to the first destination and a protection module of a second tray mapped to the second destination. The user's input may be an input for instructing initiation of protection or driving. The electronic device, in response to initiating driving for item delivery, may activate the protection modules of the first and second trays respectively mapped to the first and second destinations. The electronic device, in response to reaching the first destination, while maintaining the activation of the protection module of the second tray, may deactivate the protection module of the first tray. In the example illustrated in FIG. 8, the electronic device having reached table C, which is the first destination, may deactivate a protection module of the third serving tray accommodating the steak.

In addition, the electronic device, in response to detecting unloading of the target item having been on the serving tray at the target destination, may determine that the target item has been delivered. For example, in the example illustrated in FIG. 9, a customer may unload the steak at table C, which is the target destination. The electronic device, while staying at the target destination, may monitor, through a camera sensor, the serving tray mapped to the target destination. The electronic device, in response to detecting removal of the target item from the serving tray through the camera sensor, may determine that the target item has been delivered. When the delivery has been completed, the electronic device may turn off tray light 930 on one side of the serving tray and light 920 of a lighting module facing an upper side of the serving tray. The electronic device may output, to a customer, a serving completion notification on a display module 910. The electronic device may transmit, to an order server, data (e.g., a destination identifier, a name of served item, and a quantity) related to the serving completion notification.

In addition, the electronic device, in response to reaching the second destination, may deactivate the protection module of the second tray. For example, in the example illustrated in FIG. 9, the electronic device, in response to reaching a second destination, which is table B, may activate light 950 of a first serving tray mapped to table B and tray light 960 and deactivate a protection module. The electronic device may provide information on an item to be delivered on a display module 940. The electronic device may open a bar-shaped guard that has covered some of a tray space of the first serving tray mapped to table B.

The electronic device, by repeating the operations described above with reference to FIGS. 8 and 9 when visiting each destination sequentially, may provide the delivery of and protection for an item.

Figure 10:
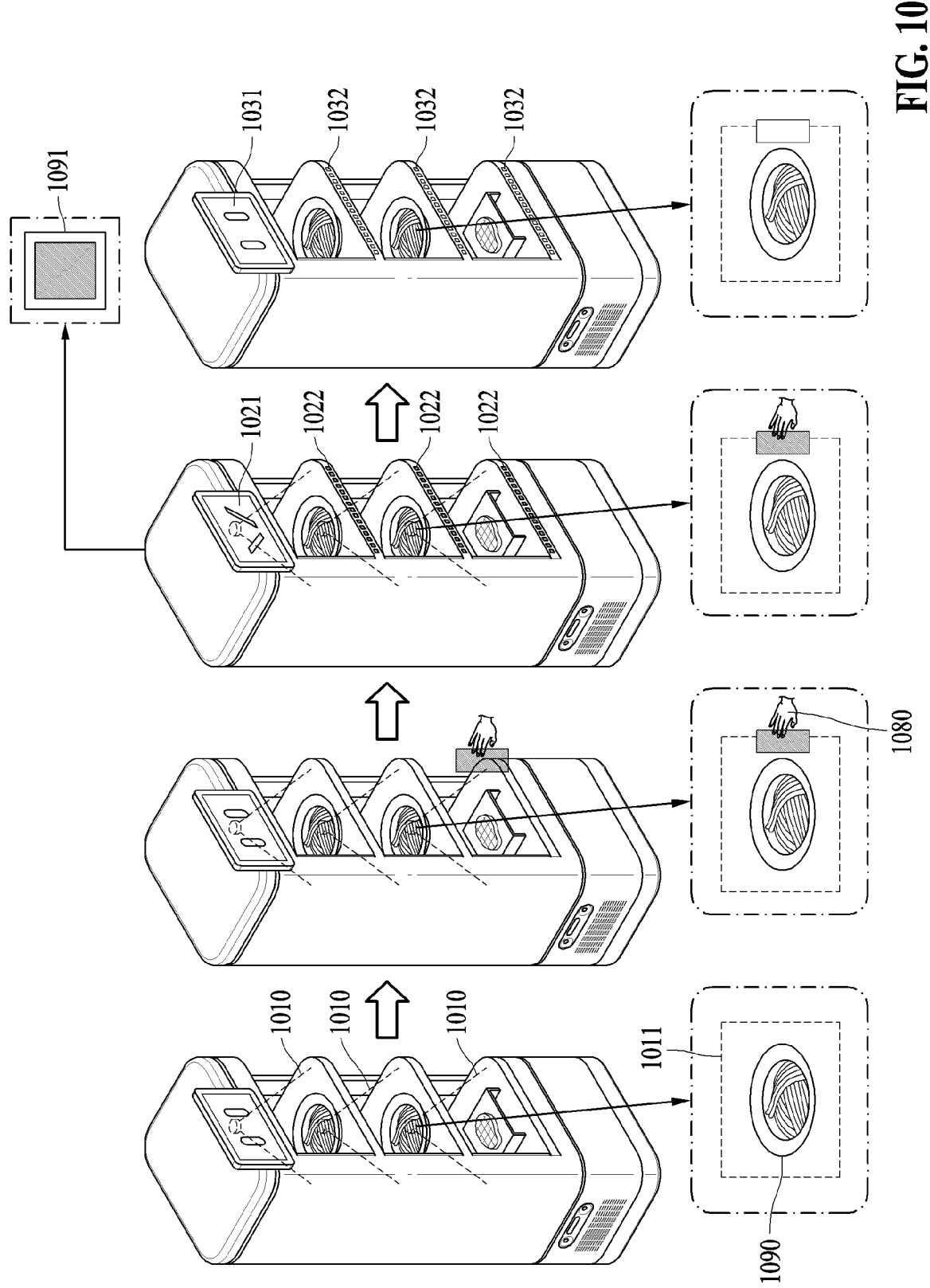
FIG. 10 is a diagram illustrating detecting invasion of an unauthorized object, according to various example embodiments.

FIG. 10 is a diagram illustrating detecting invasion of an unauthorized object, according to various example embodiments.

An electronic device may provide a non-physical protection operation. The electronic device, while a target item is delivered to one destination among the plurality of destinations, may sense access of things 1080 in a detection region defined based on a serving tray accommodating another item in a serving order subsequent to a serving order of the target item. The electronic device, through a view of a camera sensor 1010 facing each serving tray, may monitor object invasion to a serving tray mapped to a subsequent serving order to a current destination. The camera sensor 1010 may have a viewing range 1011 that is wider than a region 1090 in which an item may be on a serving tray. The electronic device may detect whether there are things 1080 (e.g., hands, gloves, and tongs) in the view range 1011 around a placed item.

The electronic device, in response to sensing access of things in a detection region, may perform a protection operation on another item. The electronic device, as the protection operation on the other item, may perform one or a combination of two or more of auditory information warning of wrongful taking of the other item, visual information warning of wrongful taking of the other item, and turning on light on one side of a serving tray. For example, the electronic device may output first color light from light on one side of a serving tray accommodating the target item and output second color light from light on one side of the serving tray accommodating the other item, wherein the second color light is different from the first color light. As another example, the electronic device, when detecting object invasion, may change color of light of all the serving trays to light 1022 of the second color (e.g., red). The electronic device may output a warning image (e.g., a warning emoji face) on a display module 1021 and may output a warning sound and warning speech. The non-physical protection operation described above may be provided with a physical protection operation.

The electronic device, in response to the things 1080 disappearing without wrongfully taking an item and the item being left intact, may determine that food safety is secured for a serving tray. The electronic device may determine that an abnormal situation has ended. The electronic device may display a screen, which had been output before the abnormal situation occurred, on a display module 1031 and may change the color of the tray light to light 1032 of a first color (e.g., green). The electronic device may output sound and speech (e.g., the speech of "Food is on its way") for indicating safety of an item. Accordingly, the electronic device may provide feedback that the item is safe to a user and a customer.

The electronic device, in response to the things 1080 being outside the view range 1011 and wrongfully taking an item, may determine that the item on a serving tray 1091 has been wrongfully taken. The electronic device may call a user and a manager in this error situation according to the description to be provided below with reference to FIG. 19.

FIGS. 11 through 17 are diagrams illustrating a protection module (including a protector) according to various example embodiments.

Figure 11:
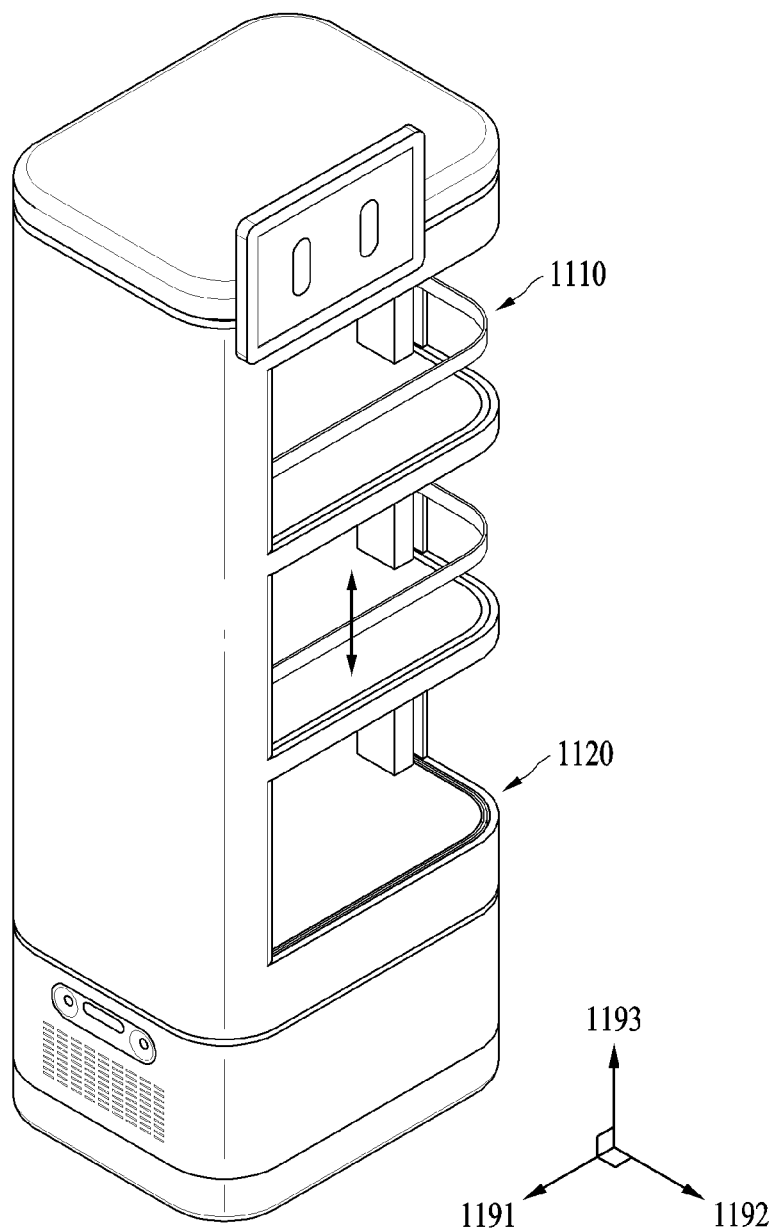
FIGS. 11-17 are diagrams illustrating a protection module according to various example embodiments.

FIG. 11 illustrates a protection operation based on a bar-shaped guard 1110. An electronic device (e.g., the electronic device 101 of FIG. 1) may further include a protection module configured to drive the bar-shaped guard 1110 movably disposed along an axis 1193 perpendicular to a surface of a serving tray from at least one side of each of the plurality of serving trays. Although FIG. 11 illustrates an example of disposing the bar-shaped guard 1110 on one side of each of the serving trays, examples are not limited thereto. The bar-shaped guard 1110, as an example of a protector, may be on both sides based on a driving axis (e.g., a longitudinal axis 1191) of the electronic device. For example, the surface of the serving tray may be a surface defined by the longitudinal axis 1191 and a lateral axis 1192 of the electronic device.

The electronic device, in response to initiating protection of an item on the serving tray, may raise the bar-shaped guard 1110 along the axis 1193 perpendicular to the surface of the serving tray. The electronic device, in response to terminating the protection of the item on the serving tray, may accommodate the bar-shaped guard 1110 in a bar-shaped groove 1120 by lowering the bar-shaped guard 1110 along the axis 1193 perpendicular to the surface of the serving tray. The bar-shaped guard 1110 may be configured to be movable along an inner rail along the axis 1193, and a protection module, in response to an electrical signal based on whether each serving tray is protected, may perpendicularly move the bar-shaped guard 1110 through a power transmission structure including one or a combination of two or more of a linkage connected to a motor, a chain, a belt, and a thread structure.

Figure 12:
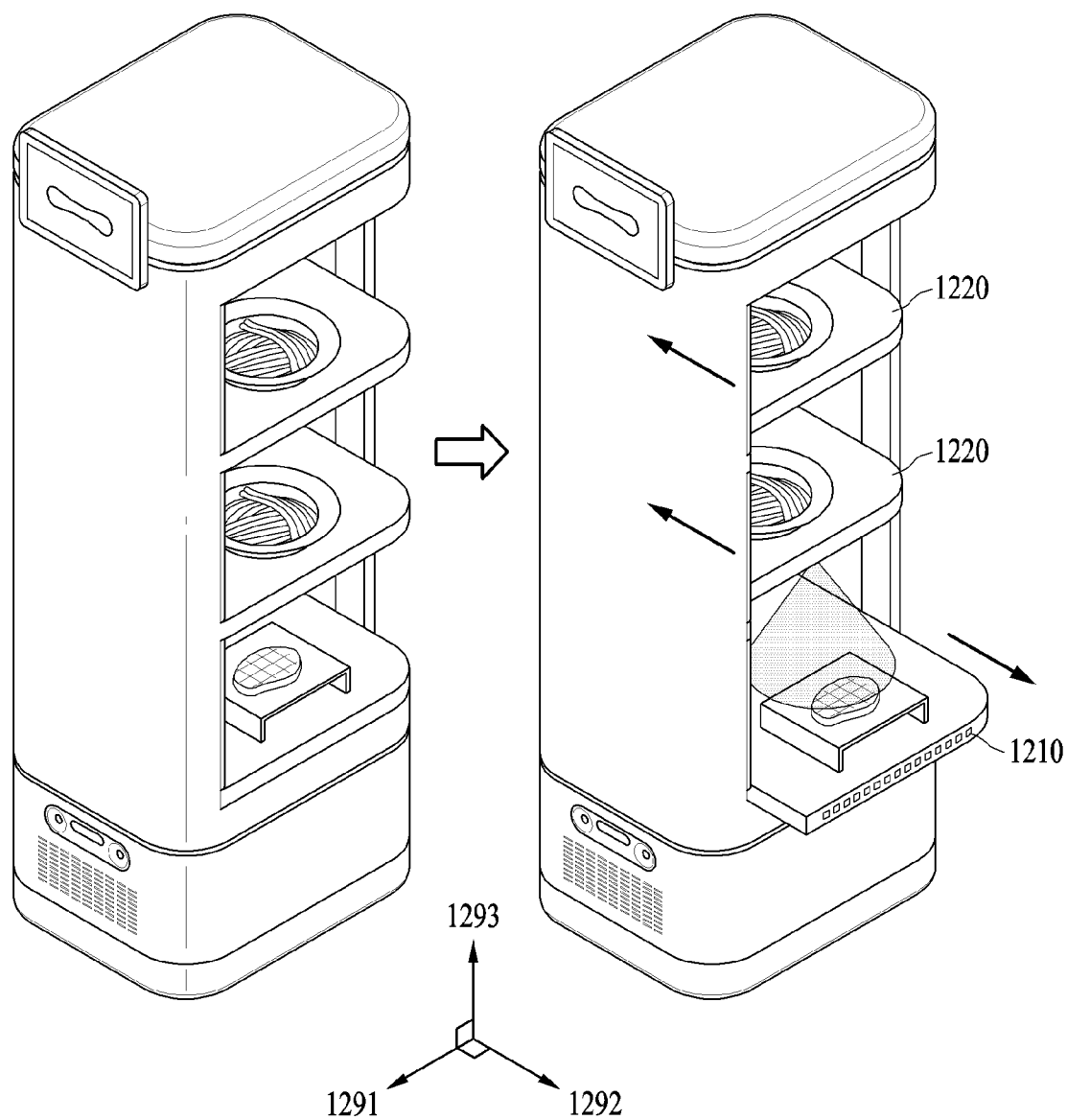

FIG. 12 illustrates a protection module configured to move a serving tray. The protection module may further include a protection module configured to move each of the plurality of serving trays along one axis of the electronic device. For example, the electronic device may slide a serving tray along a lateral axis 1292 of the electronic device. The lateral axis 1292 may be an axis perpendicular to a vertical axis 1293 and a longitudinal axis 1291 of the electronic device.

The electronic device, while a target item is delivered to a target destination, may move a serving tray accommodating the target item, among the plurality of serving trays, along one axis in one direction. The electronic device, at the target destination, may move, along the axis in an opposite direction to the direction, another serving tray accommodating another item different from the target item. For example, the electronic device may slide a serving tray 1210 mapped to the target destination to a customer and move the remaining serving trays 1220 away from the customer. The electronic device may explicitly guide a customer to a serving tray accommodating an item to be delivered by activating a lighting module and tray light, for example, for the serving tray 1210 that moved forward to the customer. The electronic device may intuitively notify a customer of an item to be delivered and at the same time, may decrease the customer's accessibility by moving an item of which delivery is restricted away from the customer.

Figure 13:
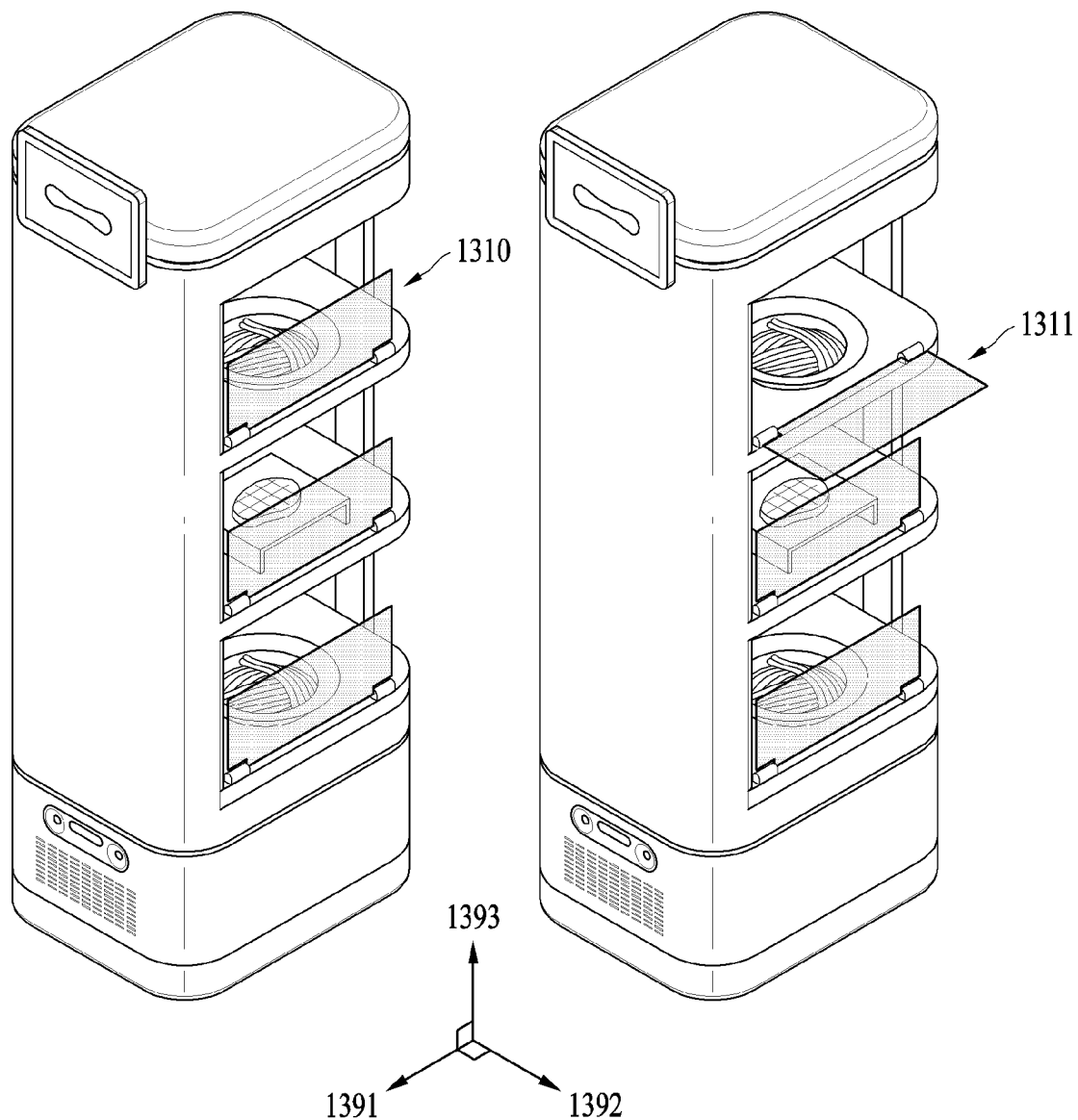
Figure 14:
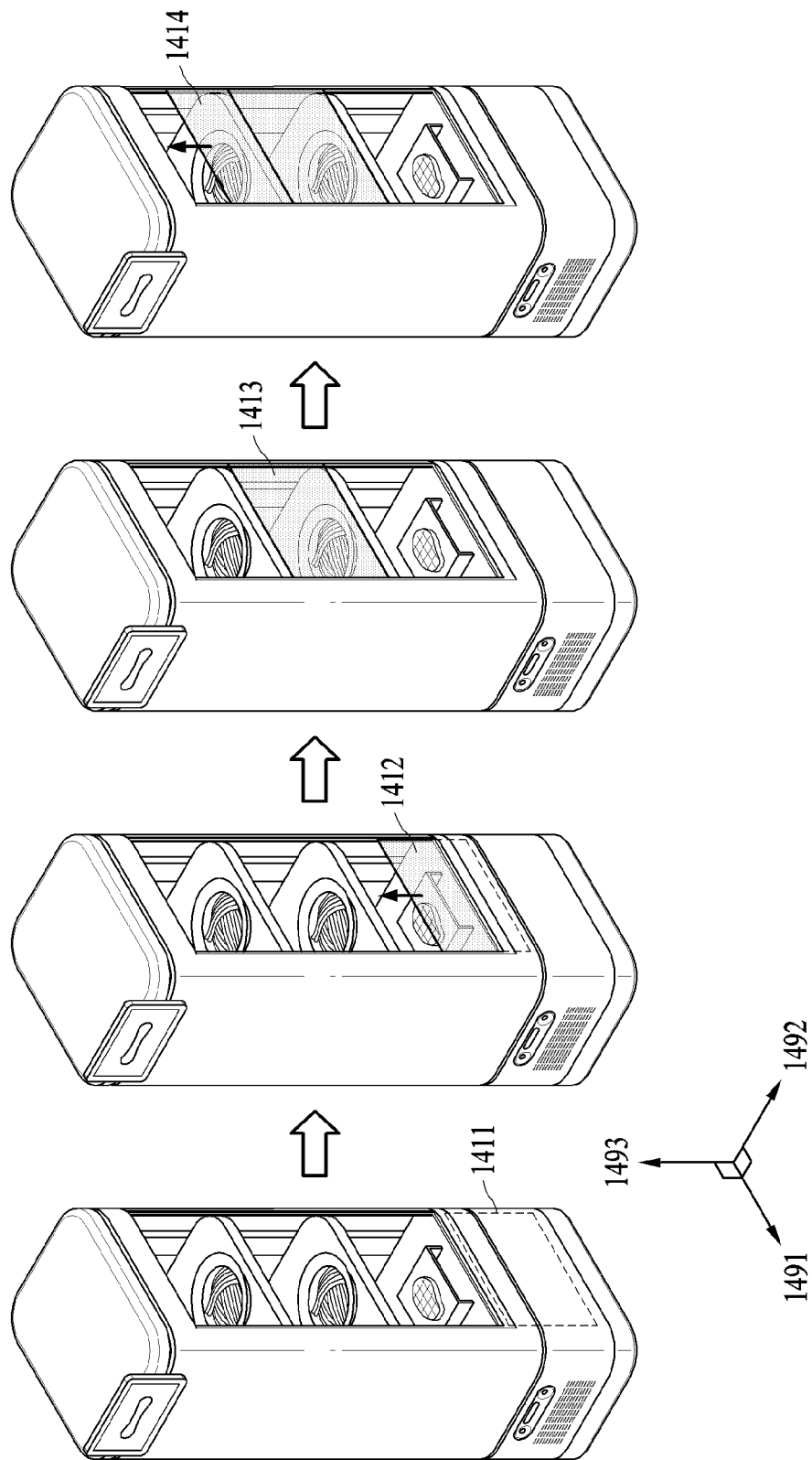
Figure 15:
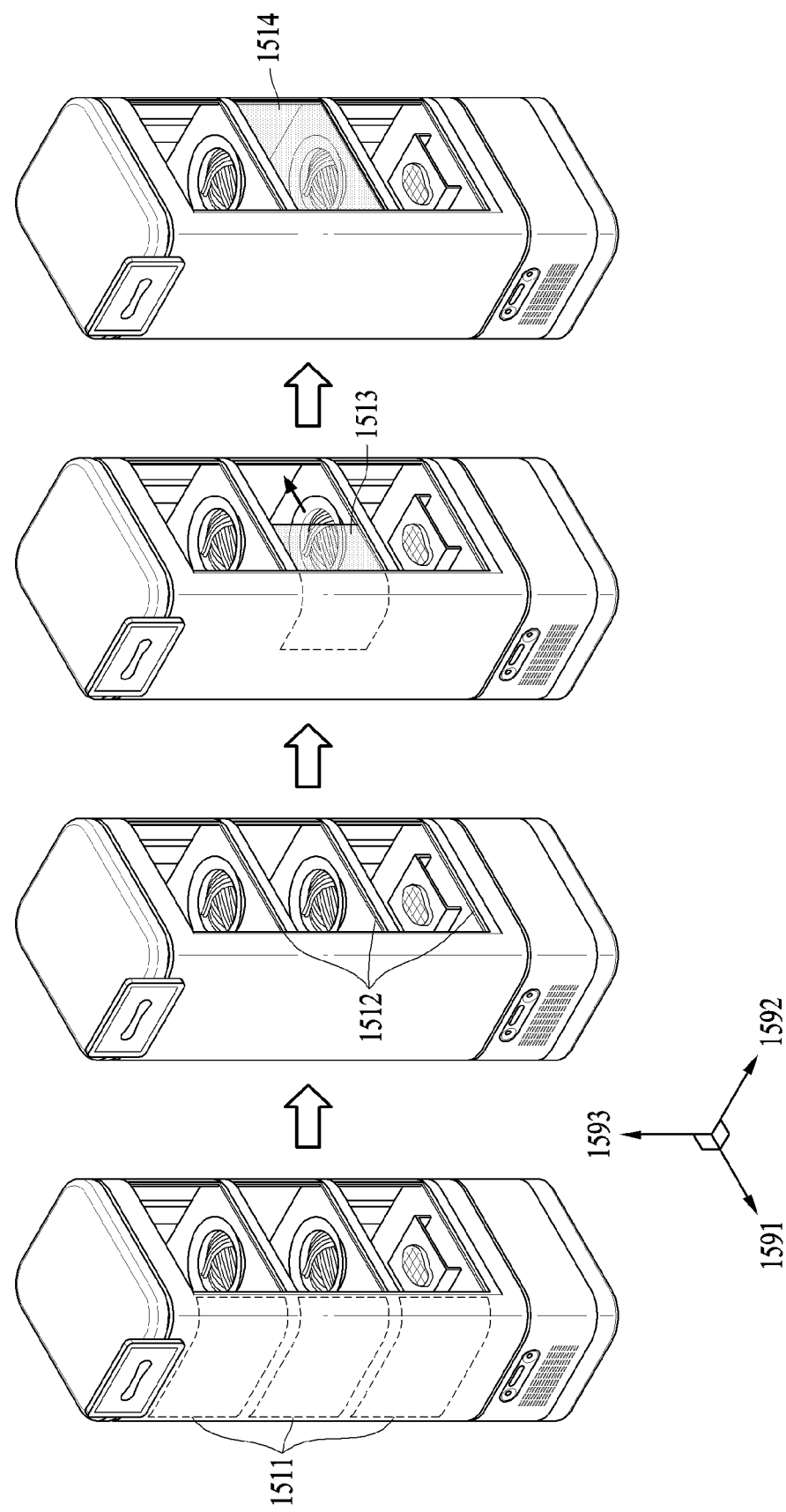

FIGS. 13, 14, and 15 each illustrate a protection operation using a partition guard. The electronic device may further include a protection module configured to drive a partition guard configured to open and close at least some tray space of each of a plurality of serving trays. The electronic device, while a target item is delivered to a target destination, may open a tray space corresponding to a serving tray accommodating the target item, among the plurality of serving trays. The electronic device, while the target item is delivered, may close at least some tray space corresponding to a serving tray accommodating another item. The partition guard may be implemented with one or a combination of two or more of materials including a mesh type, a perforation type, an origami type, a curtain type, a sliding door type, a comb pattern type, a chain type, and a fabric type. For example, the partition guard may be configured with a mesh-type material and to be movable through a slide structure. The partition guard may include a transparent or translucent material such that the inside of a tray space may be seen. The partition guard of a mesh-type material may ensure ventilation for food preservation, prevent or reduce the likelihood of obstruction of food confirmation from steam or dew condensation, protect food items from pests, and block inflow of matter, dust, and saliva of customers from other tables.

In FIG. 13, the partition guard, when closed, may cover some area of one side of a tray space of each serving tray. For example, the height of the partition guard along a vertical axis 1393 may be lower than the height of the tray space of each serving tray along the vertical axis 1393. For example, a closed partition guard 1310 may cover a half of one side of a tray space. The closed partition guard 1310 may decrease a customer's accessibility to an item. The partition guard may be configured to be rotatable based on an axis parallel to a longitudinal axis 1391 and/or lateral axis 1392, and the protection module may open or close the partition guard by rotating the partition guard. The partition guard may have a rotatable hinge structure. The partition guard may open at a destination to which food needs to be delivered. A customer may explicitly recognize, through an opened partition guard 1311, that a placed item is allowed to be taken.

In FIG. 14, a partition guard 1411, before an electronic device drives to a destination, may be invisibly included. The partition guard 1411 may have a type and a size that may entirely cover one side of a tray space. The partition guard 1411 may be spaced apart from another and accommodated along a lateral axis 1492 of the electronic device on both sides of the electronic device based on a longitudinal axis 1491 of the electronic device. Partition guards disposed on both sides of the electronic device each may have a sliding hinge structure. The electronic device, in response to determining a serving tray to be protected, may move a partition guard 1412 along a vertical axis 1493 of the electronic device toward the serving tray to be protected. The electronic device may maintain a position of a partition guard 1413 that arrives at the serving tray to be protected. When another serving tray is additionally determined to be a protection target, the electronic device may extend a partition guard 1414. For example, the electronic device may stack a plurality of partition guards and sequentially move each of the plurality of partition guards or may extend a partition guard configured with an elastic material.

FIG. 15 illustrates an example of individually disposing a partition guard at a height corresponding to each serving tray. The electronic device may invisibly accommodate a movable partition guard 1511 at a front end of the electronic device based on a longitudinal axis 1591 of the electronic device. The electronic device may move a partition guard through a sliding hinge structure 1512. The electronic device may move a partition guard 1513 corresponding to a serving tray accommodating a protection target. The electronic device may prevent or reduce the likelihood of an unauthorized customer from accessing an item by closing a tray space through a moved partition guard 1514. For reference, an example of moving a partition guard to one side of the electronic device is illustrated in FIG. 15, but examples are not limited thereto, and a partition guard may be deployed on both sides based on the longitudinal axis 1591 of the electronic device. The longitudinal axis 1591 of the electronic device may be a driving axis of the electronic device and may be, for example, perpendicular to a vertical axis 1593 and a horizontal/lateral axis 1592 of the electronic device.

For reference, the protection module described with reference to FIGS. 11 through 15 may move a protection guard on only one side or both sides of the electronic device based on a longitudinal axis of the electronic device. The electronic device reaching each destination may identify a direction of a destination to which an item is to be served, based on a longitudinal axis of the electronic device, and may drive a protection guard in the identified direction. As another example, the electronic device may rotate a body of the electronic device based on a vertical axis such that a side of the electronic device from which a customer at a destination may be comfortably served may face the customer.

Figure 16:
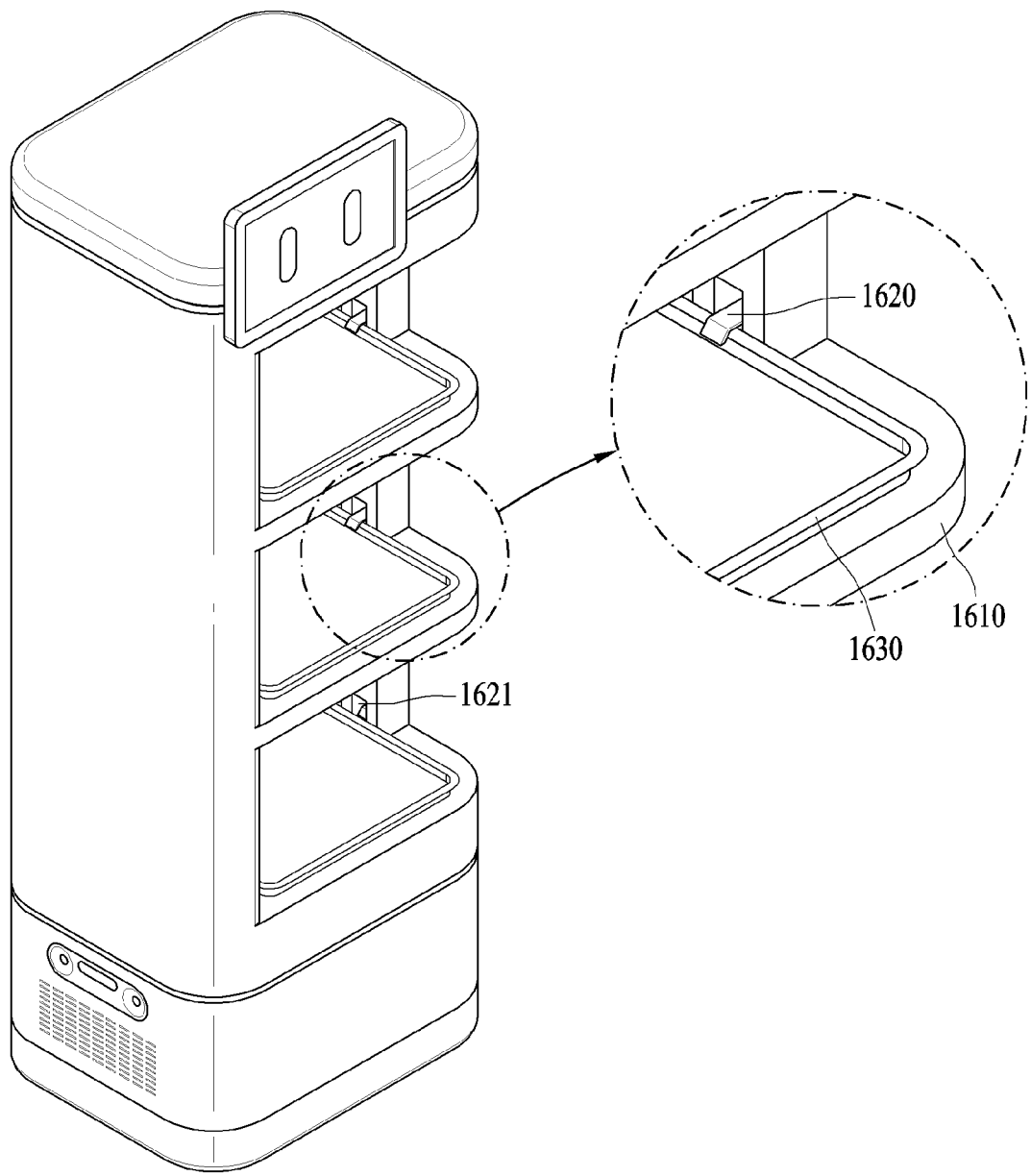

FIG. 16 illustrates an operation of fixing an edge 1630 on a serving tray 1610. The electronic device may further include a protection module configured to drive a fixer 1620 configured to fix the edge 1630 of each of a plurality of serving trays. The electronic device, while a target item is delivered to a target destination, may unfix the edge 1630 of a serving tray accommodating the target item and maintain the edge 1630 of another serving tray accommodating another item, fixed. An unlocked fixer 1621 may unlock the edge 1630. The fixer 1620 may hold the edge 1630 by mechanically locking a vertical height of a latch hung on the edge 1630. Accordingly, the electronic device may prevent or reduce the likelihood of another customer from unrightfully taking another item by locking the edge 1630, where the other item is placed.

Figure 17:
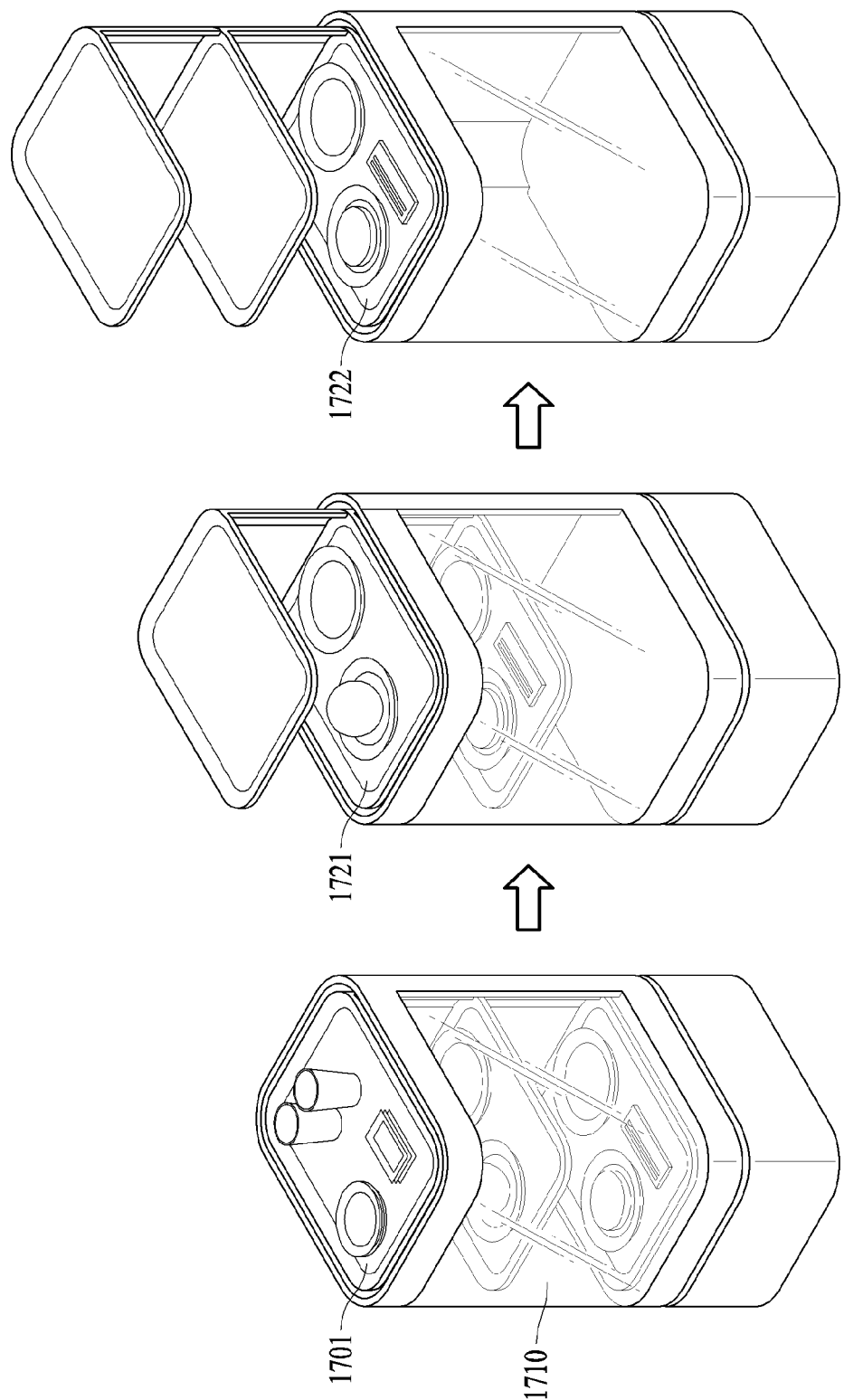

FIG. 17 illustrates an operation of raising and lowering a serving tray along a vertical axis.

The electronic device may further include a protection module configured to protect a plurality of serving trays by accommodating the plurality of serving trays in a protection space defined by a protection guard and move the plurality of serving trays along an axis perpendicular to the plurality of serving trays. The protection guard configured with a transparent, translucent, or mesh material may be disposed along the edges of the electronic device, and serving trays accommodated inside the protection guard may be observed from outside. The protection guard may be implemented as a portion of a housing of the electronic device.

In FIG. 17, a shared tray 1701, which is a tray accommodating a shared item (e.g., tableware) provided for ease of access to all customers, may be disposed above the protection space 1710. A serving tray accommodating a main item (e.g., a main dish) may be accommodated inside the protection space 1710 defined by the protection guard, and thus, the main item may be protected. Accordingly, the hygiene, freshness, and temperature of the main item may be maintained during the delivery of the main item.

The electronic device, in response to reaching a target destination, may expose a serving tray accommodating a target item by elevating the serving tray higher than the protection space 1710. For example, the electronic device may elevate a first serving tray 1721 higher than the protection space 1710 at a first destination. The electronic device may elevate a second serving tray 1722 higher than the protection space 1710 at a second destination. The second serving tray 1722 may be lower than the first serving tray 1721, and the first and second serving trays 1721 and 1722 may be uniformly elevated and lowered together.

Figure 18:
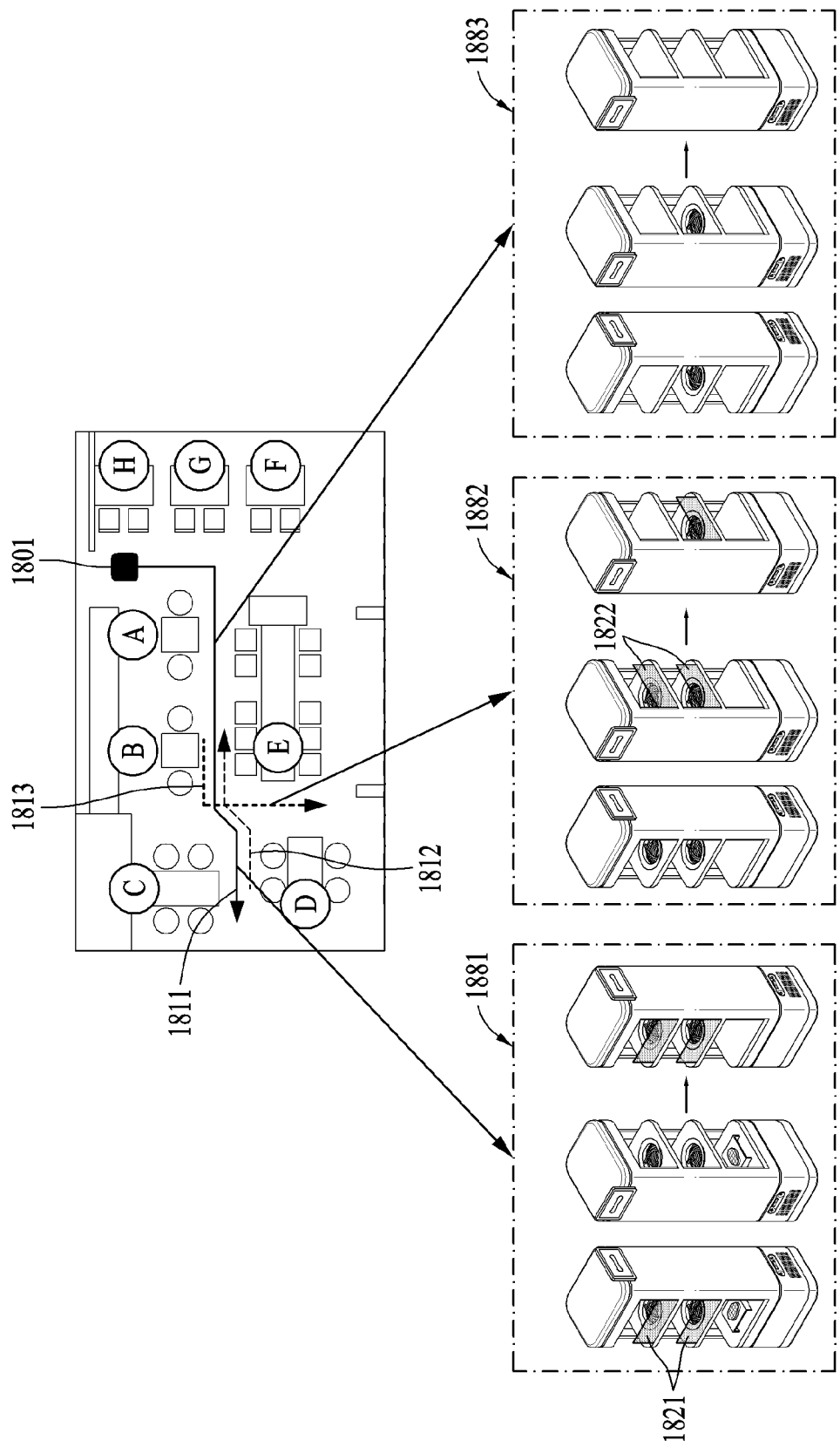
FIG. 18 is a diagram illustrating protection based on a direction of an electronic device according to various example embodiments.

FIG. 18 is a diagram illustrating protection based on a direction of an electronic device according to various example embodiments.

An electronic device (e.g., the electronic device 101 of FIG. 1) may further include a protection module that may selectively prevent or reduce the likelihood of entry of an object from both sides of a plurality of serving trays based on one axis (e.g., a driving axis or a longitudinal axis) of the electronic device.

For example, the electronic device, in response to the electronic device reaching a target destination to which a target item is to be delivered, may provide protection to a side corresponding to the target destination based on the axis of the electronic device in a serving tray accommodating the remaining items different from the target item. The electronic device, when reaching a destination, may recognize a serving direction at the destination, deploy a protection guard in the recognized serving direction, rotate in a direction for serving, and provide an item.

FIG. 18 illustrates an example of sequentially visiting tables C, B, and E from a starting position 1801 by the electronic device. An electronic device 1881 reaching table C by driving along a first route 1811 may recognize that table C is on the right side of the electronic device based on a driving axis of the electronic device. The electronic device 1881 may activate a protection guard 1821 on the right side of the electronic device based on the driving axis of the electronic device. A protection module of a third serving tray accommodating an item to be delivered may be deactivated. An electronic device 1882, in response to completed delivery to table C, may drive along a second route 1812 and reach table B. The electronic device 1882 may recognize that table B is on the left side of the electronic device based on a driving axis of the electronic device. The electronic device 1882 may activate a protection guard 1822 on the left side of the electronic device. A protection module of a first serving tray accommodating an item to be delivered may be deactivated. An electronic device 1883 may reach table E along a third route 1813. Because table E is on the left side of the electronic device 1883, the electronic device 1883 may provide an item to a customer by deactivating a protection module on the left side of a second serving tray.

Figure 19:
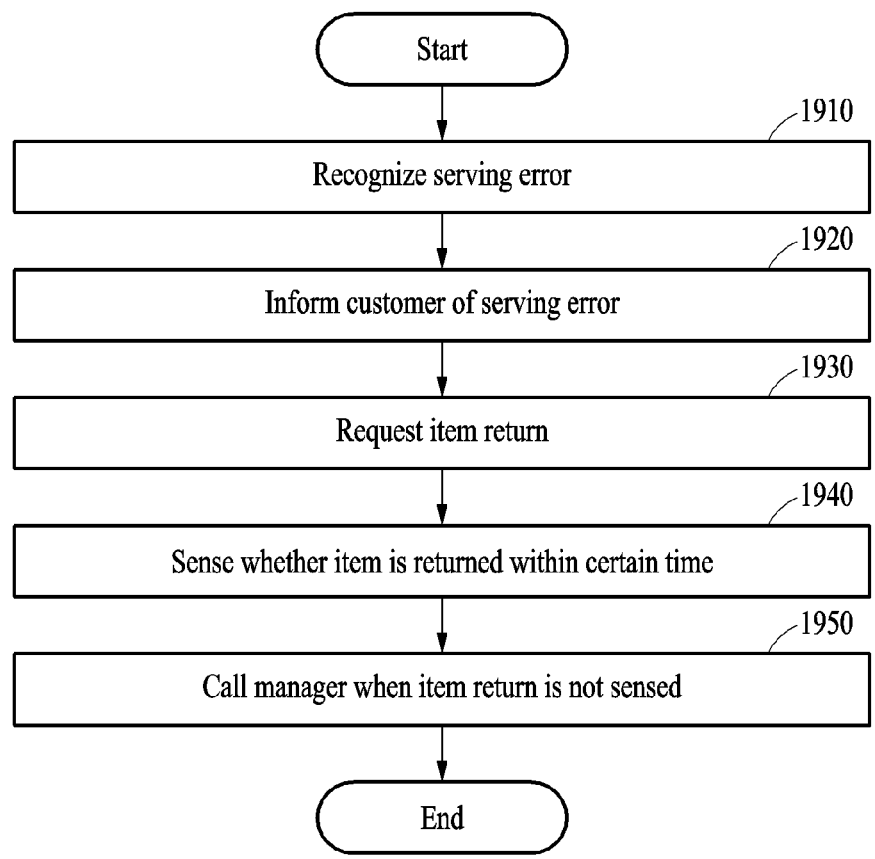
FIG. 19 is a flowchart illustrating a processing method of a serving error according to various example embodiments.

FIG. 19 is a flowchart illustrating a processing method of a serving error according to various example embodiments.

As described above, an electronic device (e.g., the electronic device 101 of FIG. 1), when a serving error that an item to be served is wrongfully taken or lost occurs, may call a manager.

In operation 1910, the electronic device may recognize a serving error (e.g., wrong delivery). For example, the electronic device may determine that a serving error occurs in response to at least one of the cases when a destination identifier does not match a destination and when an item is lost at a different destination from a serving order.

In operation 1920, the electronic device may inform a customer of the serving error. For example, the electronic device may inform a customer at a destination that an item is not an item ordered from the destination through one or a combination of two or more of visual information, auditory information, and tactile information.

In operation 1930, the electronic device may request a customer to return an item. The electronic device, in response to a target item being unloaded before arriving at a target destination, may request a customer of another destination to return the target item. The electronic device may output one or a combination of two or more of visual information, auditory information, and tactile information for requesting the customer to return the item to a serving tray.

In operation 1940, the electronic device may sense whether the item is returned within a certain time. For example, the electronic device may monitor that the same item is re-detected on the serving tray within a threshold time from when recognizing the serving error and informing the customer of the serving error.

In operation 1950, the electronic device, in response to sensing that the target item is not returned, may call a manager (e.g., user). The electronic device, when recognizing that an item is completely missing, may call a manager to a destination by transferring a notification message to a terminal (e.g., a mobile phone and a wearable device) of the manager (e.g., the user).

What is claimed is:

1. An electronic device comprising:
   a plurality of serving trays each configured to accommodate an item;
   a driver configured to move the electronic device;
   a memory configured to store computer-executable instructions; and
   a processor including processing circuitry configured to execute the computer-executable instructions at least by accessing the memory,
   wherein the computer-executable instructions are configured to, when executed by the processor, cause the electronic device to:
   based at least on items on the plurality of serving trays and pieces of order information of a plurality of destinations, determine a serving order in which the items on the plurality of serving trays are to be delivered,
   based at least on an item being delivered to a first destination among the plurality of destinations, provide protection for a serving tray to which a serving order subsequent to a serving order of the first destination is mapped,
   while a target item is delivered to the first destination among the plurality of destinations, sense access of things in a detection region defined based at least on a serving tray accommodating another item in a serving order different from a serving order of the target item, and
   output a first color light on a side of a serving tray accommodating the target item and output a second different color light on a side of the serving tray accommodating the other item.

2. The electronic device of claim 1, wherein the computer-executable instructions are further configured to,
   in response to an item being on at least one serving tray among the plurality of serving trays, identify the item on the at least one serving tray, and
   based at least on the pieces of order information of the plurality of destinations and an identification result of the item, map the at least one serving tray accommodating the item, among the plurality of serving trays, to one destination among the plurality of destinations.

3. The electronic device of claim 2, wherein the computer-executable instructions are further configured to;
   based on a mapping result of the at least one serving tray and the pieces of order information of the plurality of destinations, determine a serving order of the at least one serving tray accommodating the item.

4. The electronic device of claim 2, wherein the computer-executable instructions are further configured to:
   based at least on time information related to delivery of an item from the pieces of order information of the plurality of destinations, determine a serving order of a plurality of items on the plurality of serving trays.

5. The electronic device of claim 1, wherein
   the plurality of destinations includes the first destination and a second destination corresponding to a serving order subsequent to a serving order of the first destination, and
   the computer-executable instructions are further configured to:
   based on a user's input, activate a protection module, comprising a protector, of a first tray mapped to the first destination and a protection module, comprising a protector, of a second tray mapped to the second destination,
   in response to the electronic device reaching the first destination, while maintaining the protection module of the second tray activated, deactivate the protection module of the first tray, and
   in response to the electronic device reaching the second destination, deactivate the protection module of the second tray.

6. The electronic device of claim 1, wherein the computer-executable instructions are further configured to;
   in response to a target item reaching a target destination, provide a guide for indicating a serving tray accommodating the target item.

7. The electronic device of claim 6, wherein the computer-executable instructions are further configured to:
   as the guide for indicating a serving tray accommodating the target item, perform one or a combination of two or more of: activation of light on a first side of the serving tray accommodating the target item, activation of light for lighting up the target item, an output of visual information for describing the target item on a display, and an output of auditory information for describing the target item.

8. The electronic device of claim 1, wherein the computer-executable instructions are further configured to;
in response to detecting unloading of a target item having been on a serving tray at a target destination, determine that the target item has been delivered.

9. The electronic device of claim 1, wherein the computer-executable instructions are further configured to;
in response to sensing the access of things in the detection region, perform a protection operation on the other item.

10. The electronic device of claim 9, wherein the computer-executable instructions are further configured to:
provide protection for the other item by, performing one or a combination of two or more of: auditory information warning of wrongful taking of the other item, visual information warning of wrongful taking of the other item, and activating light on one side of a serving tray.

11. The electronic device of claim 1, further comprising:
a protection module, comprising a protector, configured to move each of the plurality of serving trays along one axis of the electronic device,
wherein the computer-executable instructions are further configured to;
while a target item is delivered to a target destination, move a serving tray accommodating the target item, among the plurality of serving trays, along the axis of the electronic device in one direction.

12. The electronic device of claim 11, wherein the computer-executable instructions are further configured to:
at the target destination, move, along the axis of the electronic device in an opposite direction to the direction, another serving tray accommodating another item different from the target item.

13. The electronic device of claim 1, further comprising:
a driveable partition guard configured to open and close at least some tray space of each of the plurality of serving trays,
wherein the computer-executable instructions are further configured to;
while a target item is delivered to a target destination, open a tray space corresponding to a serving tray accommodating the target item, among the plurality of serving trays, and
while the target item is delivered, close at least some tray space corresponding to a serving tray accommodating another item.

14. The electronic device of claim 1, further comprising:
a driveable fixer configured to fix an edge of each of the plurality of serving trays,
wherein the computer-executable instructions are further configured to:
while a target item is delivered to a target destination, unfix an edge of a serving tray accommodating the target item and maintain an edge of another serving tray, accommodating another item, fixed.

15. The electronic device of claim 1, further comprising:
a protection module, comprising a protector, configured to protect the plurality of serving trays by accommodating the plurality of serving trays in a protection space defined by a protection guard and move the plurality of serving trays along an axis perpendicular to the plurality of serving trays,
wherein the computer-executable instructions are further configured to:
in response to reaching a target destination, expose a serving tray accommodating a target item by elevating the serving tray higher than the protection space.

16. The electronic device of claim 1, further comprising:
a protection module, comprising a protector, configured to selectively prevent and/or reduce the likelihood of entry of an object from both sides of the plurality of serving trays, based on one axis of the electronic device,
wherein the computer-executable instructions are further configured to;
in response to the electronic device reaching a target destination to which a target item is to be delivered, provide protection to a side corresponding to the target destination based on the axis in a serving tray accommodating the remaining items different from the target item.

17. The electronic device of claim 1, wherein the computer-executable instructions are further configured to:
in response to a target item being unloaded before arriving at a target destination, request a customer of another destination to return the target item, and
in response to sensing that the target item is not returned, call a user.

18. An electronic device comprising:
a plurality of serving trays each configured to accommodate an item;
a driver configured to move the electronic device;
a driveable bar-shaped guard movably disposed along an axis perpendicular to a surface of a serving tray from at least one side of each of the plurality of serving trays;
a memory configured to store computer-executable instructions; and
a processor including processing circuitry configured to execute the computer-executable instructions at least by accessing the memory,
wherein the computer-executable instructions are configured to, when executed by the processor, cause the electronic device to:
based at least on items on the plurality of serving trays and pieces of order information of a plurality of destinations, determine a serving order in which the items on the plurality of serving trays are to be delivered,
based at least on an item being delivered to a first destination among the plurality of destinations, provide protection for a serving tray to which a serving order subsequent to a serving order of the first destination is mapped,
in response to initiating protection of an item on the serving tray, raise the bar-shaped guard along the axis perpendicular to the surface of the serving tray, and
in response to terminating the protection of the item on the serving tray, accommodate the bar-shaped guard in a bar-shaped groove by lowering the bar-shaped guard along the axis perpendicular to the surface of the serving tray.

19. A method implemented by a processor including processing circuitry, the method comprising:
based on items on a plurality of serving trays and pieces of order information of a plurality of destinations, determining a serving order in which the items on the plurality of serving trays need to be delivered, while an item is delivered to a first destination among the plurality of destinations, providing protection for a serving tray to which a serving order subsequent to a serving order of the first destination is mapped, while a target item is delivered to the first destination among the plurality of destinations, sensing access of things in a detection region defined based at least on a serving tray accommodating another item in a serving order different from a serving order of the target item, and outputting a first color light on a side of a serving tray accommodating the target item and outputting a second different color light on a side of the serving tray accommodating the other item.

20. A non-transitory computer-readable storage medium storing instructions that, when executed by a processor including processing circuitry, cause the processor to perform the method of claim 19.

\* \* \* \* \*